(12) United States Patent
Nakaguro et al.

(10) Patent No.: US 8,769,978 B2
(45) Date of Patent: Jul. 8, 2014

(54) DEHUMIDIFICATION/HUMIDIFICATION DEVICE FOR VEHICLE

(75) Inventors: Takanobu Nakaguro, Toyota (JP);
Toshihiro Tsuemoto, Toyota (JP);
Hiroyuki Kakiuchi, Yokkaichi (JP);
Hideto Hidaka, Machida (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 946 days.

(21) Appl. No.: 12/593,965

(22) PCT Filed: Mar. 28, 2008

(86) PCT No.: PCT/JP2008/056148
§ 371 (c)(1),
(2), (4) Date: Dec. 30, 2009

(87) PCT Pub. No.: WO2008/120733
PCT Pub. Date: Oct. 9, 2008

(65) Prior Publication Data
US 2010/0107673 A1   May 6, 2010

(30) Foreign Application Priority Data
Mar. 30, 2007   (JP) .................................. 2007-093781

(51) Int. Cl.
*F24F 3/14*  (2006.01)
(52) U.S. Cl.
USPC .......... 62/271; 62/94; 62/332; 62/3.2; 62/3.3; 62/3.4; 236/44 C; 236/44 A
(58) Field of Classification Search
USPC ................ 62/3.1–3.7, 3.61, 92–94, 239, 244, 62/271–272; 454/156–158; 95/90–148; 96/108–154
See application file for complete search history.

(56) References Cited

U.S. PATENT DOCUMENTS

| 3,165,900 A | 1/1965 | Huntington |
| 4,391,616 A * | 7/1983 | Imamura ........................... 95/92 |

(Continued)

FOREIGN PATENT DOCUMENTS

| DE | 43 04 075 A1 | 8/1994 |
| DE | 196 51 279 A1 | 6/1997 |

(Continued)

OTHER PUBLICATIONS

Extended European Search Report issued Feb. 28, 2011, in Application No. / Patent No. 08739266.8-1268 / 2143574 PCT/JP2008056148.

(Continued)

*Primary Examiner* — Frantz Jules
*Assistant Examiner* — Meraj A Shaikh
(74) *Attorney, Agent, or Firm* — Oblon, Spivak, McClelland, Maier & Neustadt, L.L.P.

(57) ABSTRACT

In a dehumidification/humidification device, a blower and an adsorbent module are contained in a casing. In other embodiment, the blower, the adsorbent module, and a flow passage-changing device are contained in the casing. The adsorbent module includes an adsorbing element formed by carrying an adsorbent on a permeable element and a heater directly disposed on the adsorbing element. The state of the electrification of the heater is changed and an air-blowing direction or a flow passage is changed, whereby a dehumidified air is discharged from a first suction/discharge port (or discharge port), and a humidified air is discharged from a second suction/discharge port (or discharge port).

11 Claims, 8 Drawing Sheets

(56) References Cited

U.S. PATENT DOCUMENTS

| | | | |
|---|---|---|---|
| 4,402,717 A * | 9/1983 | Izumo et al. | 96/118 |
| 5,335,719 A | 8/1994 | Khelifa et al. | |
| 6,213,198 B1 | 4/2001 | Shikata et al. | |
| 6,481,222 B1 * | 11/2002 | Denniston | 62/94 |
| 7,143,589 B2 | 12/2006 | Smith et al. | |
| 7,470,311 B2 * | 12/2008 | Sueoka et al. | 96/129 |
| 2003/0183433 A1 * | 10/2003 | MacKelvie | 180/68.1 |
| 2006/0196195 A1 * | 9/2006 | Ikegami et al. | 62/94 |
| 2007/0284095 A1 * | 12/2007 | Wang et al. | 165/166 |
| 2009/0229294 A1 | 9/2009 | Matsui | |
| 2010/0022177 A1 * | 1/2010 | Hidaka et al. | 454/156 |
| 2010/0107656 A1 * | 5/2010 | Nakaguro et al. | 62/3.4 |

FOREIGN PATENT DOCUMENTS

| | | |
|---|---|---|
| DE | 41 33 917 C2 | 6/1999 |
| DE | 198 05 011 A1 | 8/1999 |
| EP | 0 952 017 A2 | 10/1999 |
| EP | 1 666 285 A2 | 6/2006 |
| JP | 5 084415 | 4/1993 |
| JP | 5-200237 | 8/1993 |
| JP | 7-275642 A | 10/1995 |
| JP | 8 067136 | 3/1996 |
| JP | 9 020133 | 1/1997 |
| JP | 10 288487 | 10/1998 |
| JP | 2000 142096 | 5/2000 |
| JP | 2000-146220 | 5/2000 |
| JP | 2001 010326 | 1/2001 |
| JP | 2001-97038 A | 4/2001 |
| JP | 2002 228189 | 8/2002 |
| JP | 2003 114067 | 4/2003 |
| JP | 2003114067 A * | 4/2003 |
| JP | 2003-314856 A | 11/2003 |
| JP | 2003314856 A * | 11/2003 |
| JP | 2004 291863 | 10/2004 |
| JP | 2005-134097 | 5/2005 |
| JP | 2006240575 A * | 9/2006 |
| JP | 2006-306293 | 11/2006 |
| JP | 2006329600 A * | 12/2006 |

OTHER PUBLICATIONS

Korean Office Action issued Jun. 1, 2011, in Patent Application No. 10-2009-7022616 (with English-language translation).

Korean Office Action issued Jan. 18, 2012, in Patent Application No. 10-2009-7022616 (with English-language translation).

Office Action mailed Oct. 12, 2012, in co-pending U.S. Appl. No. 12/594,868.

Office Action issued in U.S. Appl. No. 12/594,868, dated Mar. 25, 2013.

Office Action issued in U.S. Appl. No. 12/594,868, dated Jul. 18, 2013.

Office Action issued in copending U.S. Appl. No. 12/594,868 on Nov. 8, 2013.

* cited by examiner

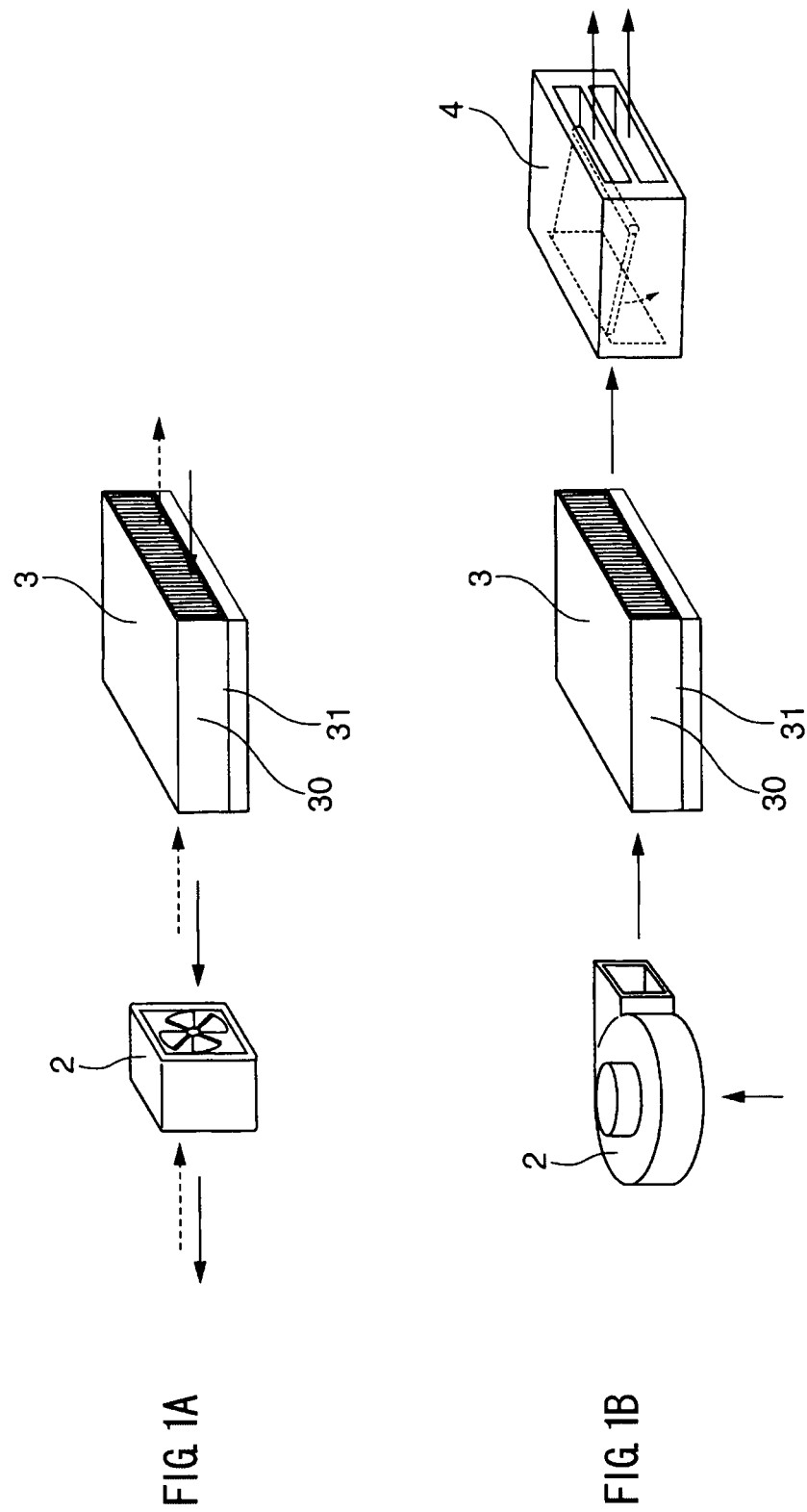

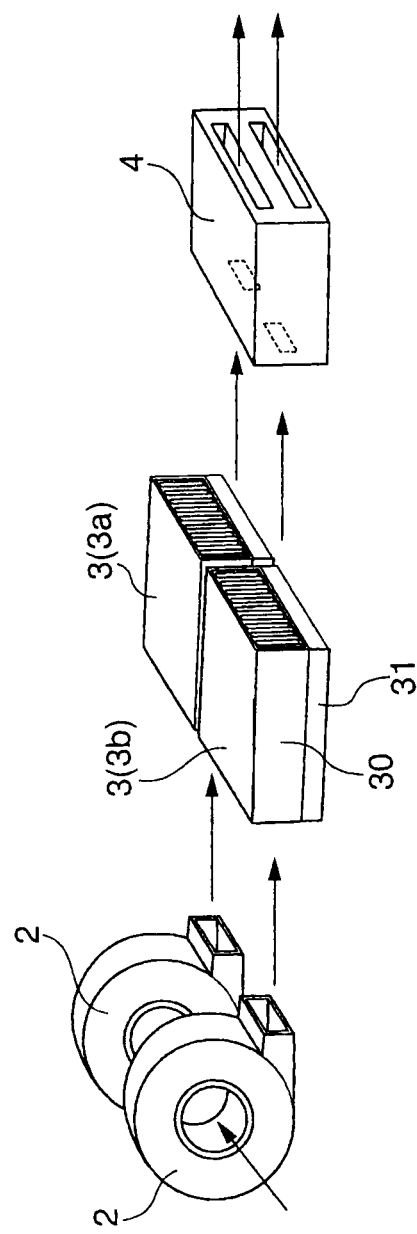
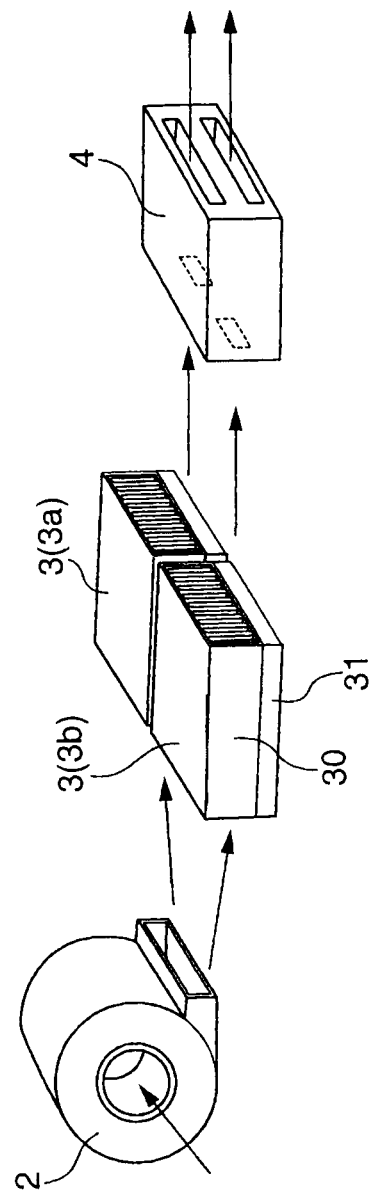
FIG. 2A
FIG. 2B

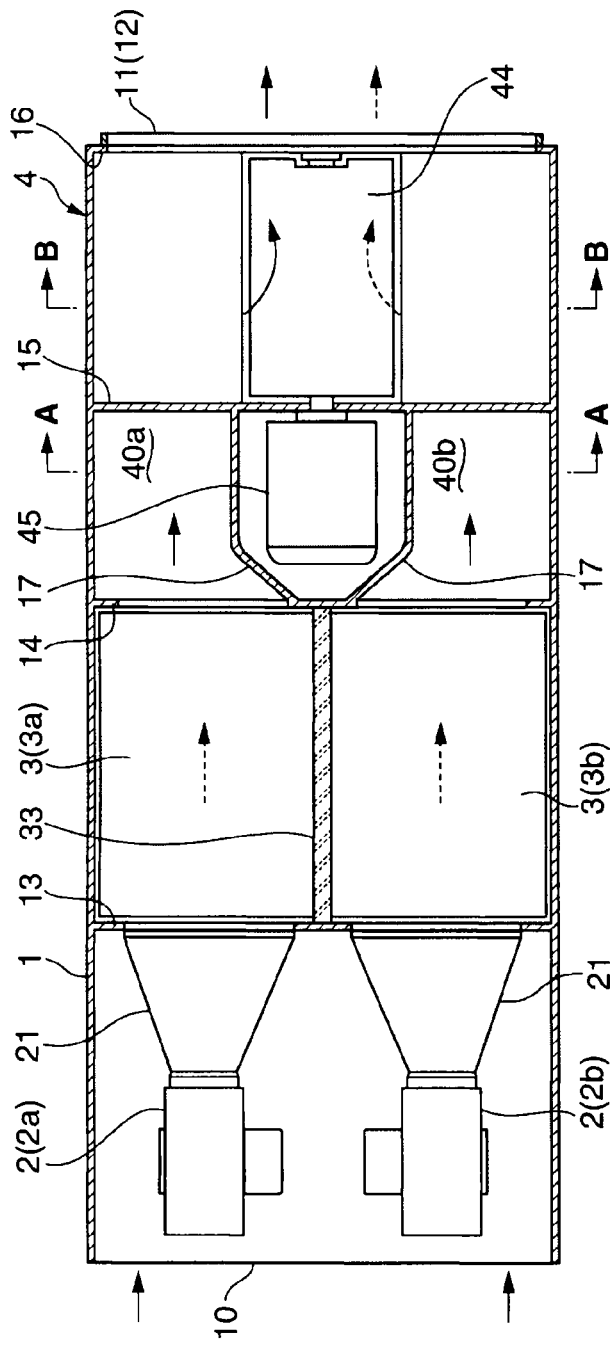
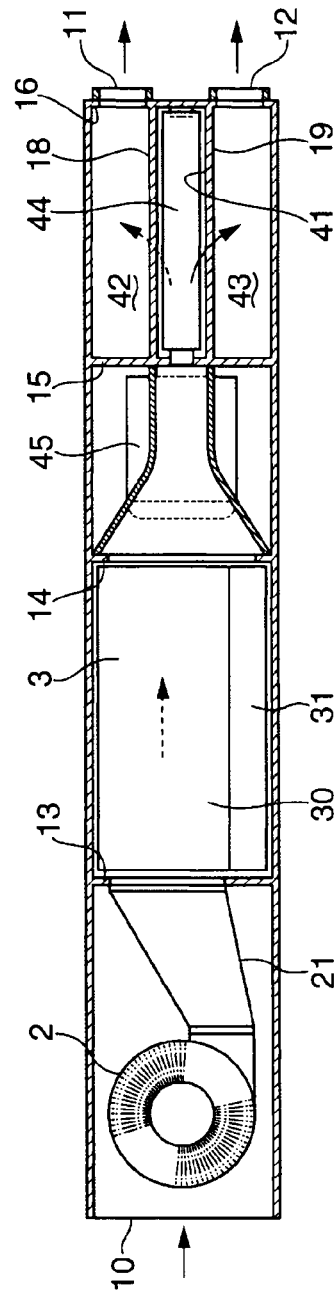
FIG. 7A
FIG. 7B

A-A CROSS SECTION

B-B CROSS SECTION

B-B CROSS SECTION

DEHUMIDIFICATION/HUMIDIFICATION DEVICE FOR VEHICLE

TECHNICAL FIELD

The present invention relates to a vehicle dehumidifying/humidifying device and particularly relates to a vehicle dehumidifying/humidifying device that utilizes the adsorbing and desorbing functions of an adsorbent to supply dehumidified air for defogging to a window and supply humidified air to a passenger in winter, for example.

BACKGROUND ART

As one vehicle cabin air conditioning technology, various dehumidification and humidification technologies that utilize the water vapor adsorbing and desorbing functions of an adsorbent have been considered in order to make the inside of a vehicle cabin more comfortable. As such a technology, there has been proposed a "vehicle cabin air conditioning method" configured such that, when dry outside air from outside the cabin is introduced for window defogging and blown against a window while air is circulated inside the cabin in winter, for example, some of the airborne water that is to be discharged from the inside of the cabin to the outside of the cabin is trapped by an adsorbent such as activated carbon or a zeolite and the trapped water is returned to the inside of the cabin to thereby prevent drying inside the cabin.

In the above-described air conditioning method, the adsorbent is carried in a so-called adsorption rotor comprising an aeratable cylindrical honeycomb structure body, the adsorption rotor is rotated at a constant velocity, water is adsorbed when part of the adsorption rotor passes a predetermined adsorption region (cabin air discharge flow path), and the adsorbent is heated by air that has been heated by an electric heater and water of the adsorbent is desorbed when part of the adsorption rotor passes a predetermined desorption region (cabin air circulation flow path), whereby the air circulating inside the cabin is humidified.

Patent Document 1: JP-A No. 2000-142096

Further, as a dehumidification and humidification technology, there has been proposed a "dehumidifying/humidifying device" where an adsorbent is carried in an annular rotating body (honeycomb structure body) that is aeratable from its inner periphery to its outer periphery and where the rotating body is disposed on the outer peripheral side of a centrifugal fan. In this dehumidifying/humidifying device, air that has been sucked in by the centrifugal fan is caused to pass directly through the rotating body, whereby water is adsorbed and air is blown as dehumidified air to the inside of the cabin, and, air that has been sucked in by the centrifugal fan is caused to pass through the rotating body as heated air via a heater disposed in a region of part of the inner peripheral side of the rotating body, whereby the water of the adsorbent is desorbed, humidified air is generated, and this is blown to the inside of the cabin.

Patent Document 2: JP-A No. 2002-228189

DISCLOSURE OF THE INVENTION

Problem that the Invention is to Solve

Incidentally, in dehumidification and humidification technologies such as described above that use an adsorbent, a rotating member such as an adsorption rotor or a rotating body is driven in a specific space such as a blowing path that configures the adsorption region and the desorption region, so a mechanism for driving the rotating member is needed, and there is the problem that the device configuration cannot be simplified. Further, a casing with a capacity sufficient enough to house these together with the rotating member drive mechanism is needed, and there is the problem that it is difficult to make the device compact. Moreover, when desorption of the adsorbent is performed, heated air that has been obtained by causing air to pass through the electric heater is used, so there are the problems that thermal efficiency is low and the heater itself becomes large in comparison to its heat emission amount.

The present invention has been made in view of the above-described circumstances, and it is an object thereof to provide a vehicle dehumidifying/humidifying device that utilizes the adsorbing and desorbing functions of an adsorbent to supply dehumidified air for defogging to a window and supply humidified air to a passenger in winter, for example, and whose device configuration can be simplified and which device can be made compact.

Means for Solving the Problem

In order to solve the above-described problem, the present invention is configured such that a fixed adsorbing element comprising an adsorbent carried in an aeratable element is employed and a heater is directly disposed on a non-aerating side of the adsorbing element to configure a module, whereby the device is made compact, and, when water that has been adsorbed by the adsorbent is to be desorbed, the adsorbing element is directly heated by the heater, whereby thermal efficiency is raised. Additionally, the present invention is made to adapt to various vehicles by four aspects that use the above-described module.

That is, a first aspect of the present invention is a vehicle dehumidifying/humidifying device that dehumidifies and humidifies air inside a vehicle cabin, the vehicle dehumidifying/humidifying device being configured by housing a blower and an adsorbent module in a casing that serves as an air flow path in which a first suction/blow-out opening and a second suction/blow-out opening are disposed, wherein the blower is a blower that is capable of forward and reverse rotation, the adsorbent module is configured by an adsorbing element comprising an adsorbent carried in an aeratable element and a heater that is directly disposed on a non-aeration surface of the adsorbing element, with the adsorbent module being disposed inside the casing such that air that is blown and sucked by the blower is capable of passing through the adsorbing element, and the vehicle dehumidifying/humidifying device is configured such that, by controlling the powered state of the heater of the adsorbent module and switching the rotational direction of the blower in accordance with the powered state of the heater, the vehicle dehumidifying/humidifying device blows out air that has been dehumidified (or humidified) from the first suction/blow-out opening and blows out air that has been humidified (or dehumidified) from the second suction/blow-out opening.

Further, a second aspect of the present invention is a vehicle dehumidifying/humidifying device that dehumidifies and humidifies air inside a vehicle cabin, the vehicle dehumidifying/humidifying device being configured by housing a blower, an adsorbent module and a flow path switching unit in a casing that serves as an air flow path in which a suction opening, a first blow-out opening and a second blow-out opening are disposed, wherein the adsorbent module is configured by an adsorbing element comprising an adsorbent carried in an aeratable element and a heater that is directly disposed on a non-aeration surface of the adsorbing element, with the adsorbent module being disposed inside the casing such that air that is blown by the blower is capable of passing through the adsorbing element, the flow path switching unit is configured to be capable of switching the application destination of air that has passed through the adsorbing element of the adsorbent module to the first blow-out opening or the second blow-out opening, and the vehicle dehumidifying/humidifying device is configured such that, by controlling the powered state of the heater of the adsorbent module and switching the flow path switching unit in accordance with the powered state, the vehicle dehumidifying/humidifying device blows out air that has been dehumidified (or humidified) from the first blow-out opening and blows out air that has been humidified (or dehumidified) from the second blow-out opening.

Further, a third aspect of the present invention is a vehicle dehumidifying/humidifying device that dehumidifies and humidifies air inside a vehicle cabin, the vehicle dehumidifying/humidifying device being configured by housing a blower, a pair of first and second adsorbent modules and a flow path switching unit in a casing that serves as an air flow path in which a suction opening, a first blow-out opening and a second blow-out opening are disposed, wherein each of the adsorbent modules is configured by an adsorbing element comprising an adsorbent carried in an aeratable element and a heater that is directly disposed on a non-aeration surface of the adsorbing element, with each of the adsorbent modules being disposed inside the casing such that air that is blown by the blower is capable of passing in parallel through each of the adsorbing elements, the flow path switching unit is configured to be capable of applying, and capable of switching the application destination of, air that has passed through the adsorbing elements of each of the adsorbent modules respectively to the first and second blow-out openings (or the second and the first blow-out openings), and the vehicle dehumidifying/humidifying device is configured such that, by switching the powered state of the heater of the first adsorbent module and the powered state of the heater of the second adsorbent module and switching the flow path switching unit in accordance with the powered states, the vehicle dehumidifying/humidifying device blows out air that has been dehumidified (or humidified) from the first blow-out opening and blows out air that has been humidified (or dehumidified) from the second blow-out opening.

Moreover, a fourth aspect of the present invention is a vehicle dehumidifying/humidifying device that dehumidifies and humidifies air inside a vehicle cabin, the vehicle dehumidifying/humidifying device being configured by housing a first blower, a first flow path switching unit, a pair of first and second adsorbent modules, a second flow path switching unit and a second blower in a casing that serves as an air flow path in which a first suction opening, a second suction opening, a first blow-out opening and a second blow-out opening are disposed, wherein each of the adsorbent modules is configured by an adsorbing element comprising an adsorbent carried in an aeratable element and a heater that is directly disposed on a non-aeration surface of the adsorbing element, with each of the adsorbent modules being disposed inside the casing such that air that is blown by each of the blowers is capable of passing in parallel respectively through each of the adsorbing elements, the first flow path switching unit is configured to be capable of applying air that has been blown from the first blower to the adsorbing element of the second adsorbent module (or the adsorbing element of the second adsorbent module) and introducing, and applying to the first blow-out opening, air that has passed through the adsorbing element of the second adsorbent module (or the adsorbing element of the first adsorbent module) and is configured to be capable of switching the application destination of air that has been blown from the first blower and the introduction destination of air that is to be applied to the first blow-out opening, the second flow path switching unit is configured to be capable of introducing, and applying to the second blow-out opening, air that has passed through the adsorbing element of the first adsorbent module (or the adsorbing element of the second adsorbent module) and applying air that has been blown from the second blower to the adsorbing element of the second adsorbent module (or the adsorbing element of the first adsorbent module) and is configured to be capable of switching the introduction destination of air that is to be applied to the second blow-out opening and the application destination of air that has been blown from the second blower, and the vehicle dehumidifying/humidifying device is configured such that, by switching the powered state of the heater of the first adsorbent module and the powered state of the heater of the second adsorbent module and switching each of the flow path switching units in accordance with the powered states, the vehicle dehumidifying/humidifying device blows out air that has been dehumidified (or humidified) from the first blow-out opening and blows out air that has been humidified (or dehumidified) from the second blow-out opening.

Effects of the Invention

According to the vehicle dehumidifying/humidifying device of the present invention, the adsorbent module is configured by directly disposing the heater on the fixed adsorbing element, and when the water in the adsorbent is to be desorbed, the adsorbing element is directly heated by heat conduction by the heater, so it is not necessary to dispose a rotating member drive mechanism as in a conventional adsorption rotor system, and, moreover, the device has excellent thermal efficiency and the adsorbing element and the heater can be made even more compact. Consequently, according to the present invention, the device configuration can be simplified and the device overall can be made even more compact.

BRIEF DESCRIPTION OF THE DRAWINGS

FIG. 1A is a block diagram showing a configural example of a vehicle dehumidifying/humidifying device pertaining to a first aspect of the present invention;

FIG. 1B is a block diagram showing a configural example of a vehicle dehumidifying/humidifying device pertaining to a second aspect of the present invention;

FIG. 2A is a block diagram showing a configural example of a vehicle dehumidifying/humidifying device pertaining to a third aspect of the present invention;

FIG. 2B is a block diagram showing a configural example of another vehicle dehumidifying/humidifying device pertaining to the third aspect of the present invention;

FIG. 7A is a plan diagram showing a partially broken view of a structural example of the vehicle dehumidifying/humidifying device of the configuration of FIG. 2A;

FIG. 7B is a side diagram showing a partially broken view of a structural example of the vehicle dehumidifying/humidifying device of the configuration of FIG. 2A;

BEST MODES FOR IMPLEMENTING THE INVENTION

Figure 3:
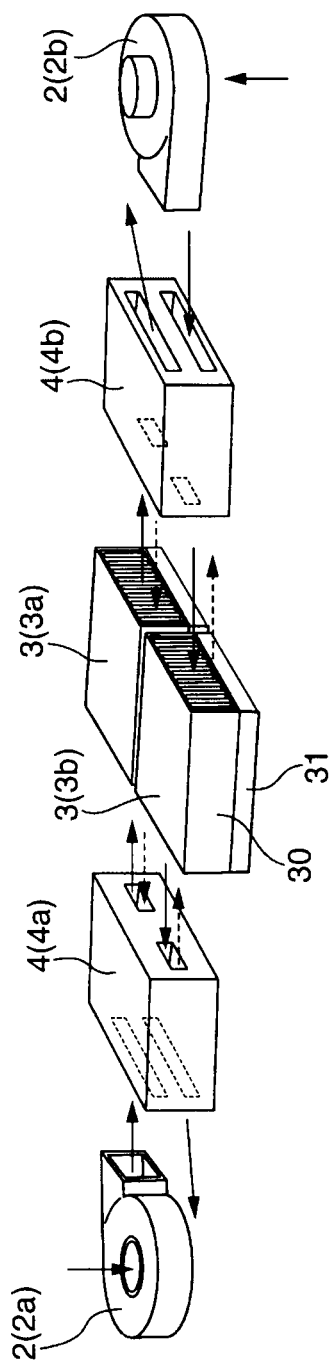
FIG. 3 is a block diagram showing a configural example of a vehicle dehumidifying/humidifying device pertaining to a fourth aspect of the present invention.
Figure 4:
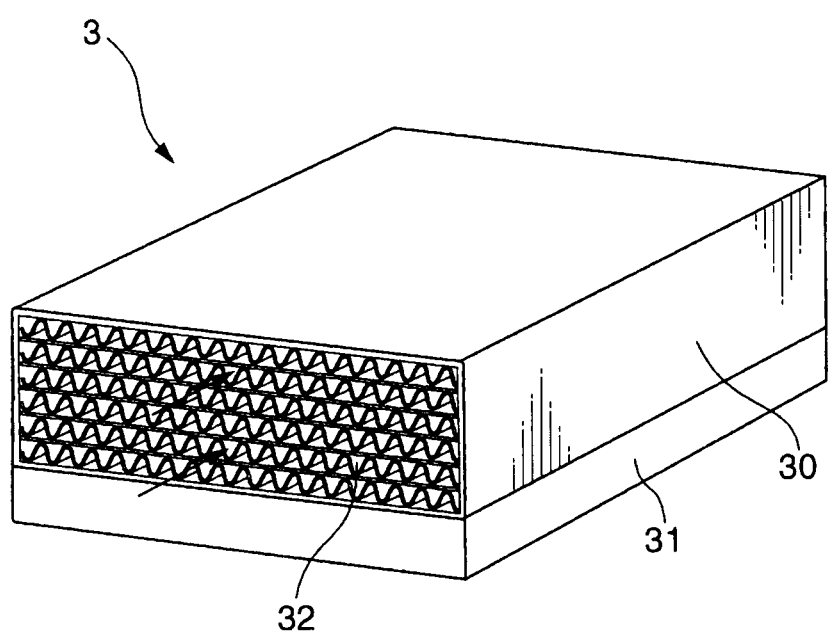
FIG. 4 is a perspective diagram showing one example of an adsorbent module that is used in the vehicle dehumidifying/humidifying device of the present invention.
Figure 5:
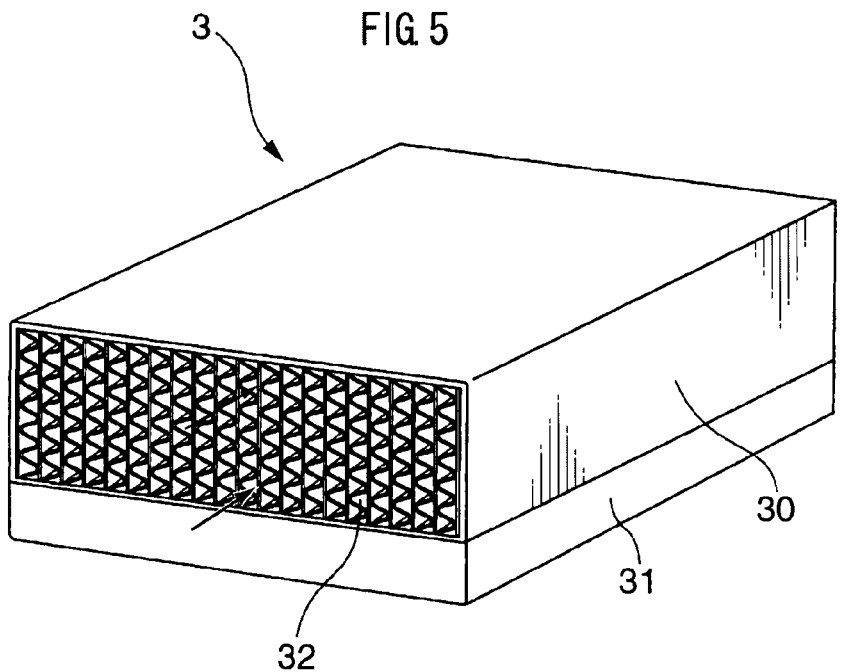
FIG. 5 is a perspective diagram showing another example of the adsorbent module that is used in the vehicle dehumidifying/humidifying device of the present invention.
Figure 6:
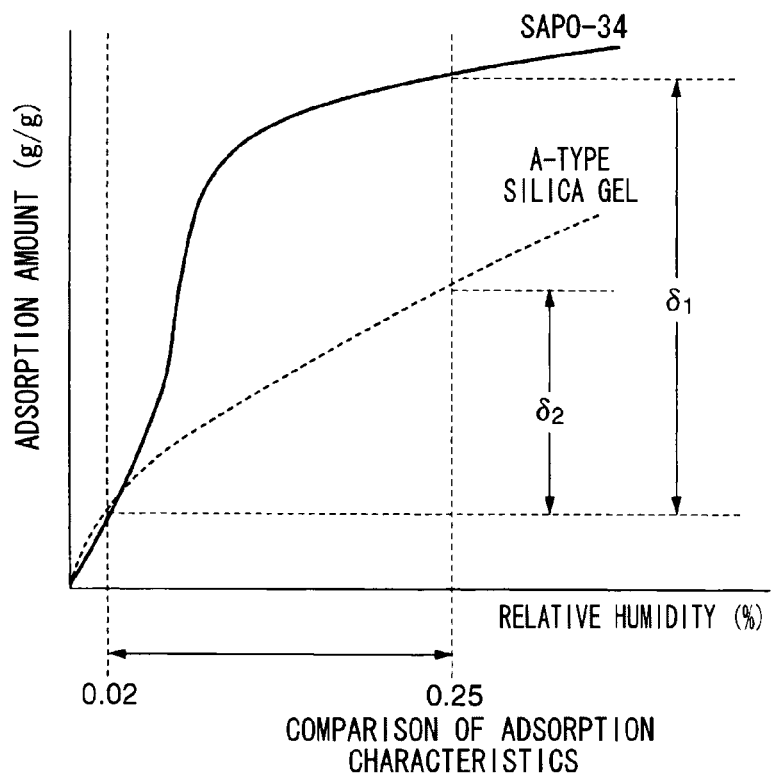
FIG. 6 is a water vapor adsorption isotherm showing an adsorption characteristic of an adsorbent that is suitable for the vehicle dehumidifying/humidifying device of the present invention.
Figure 8:
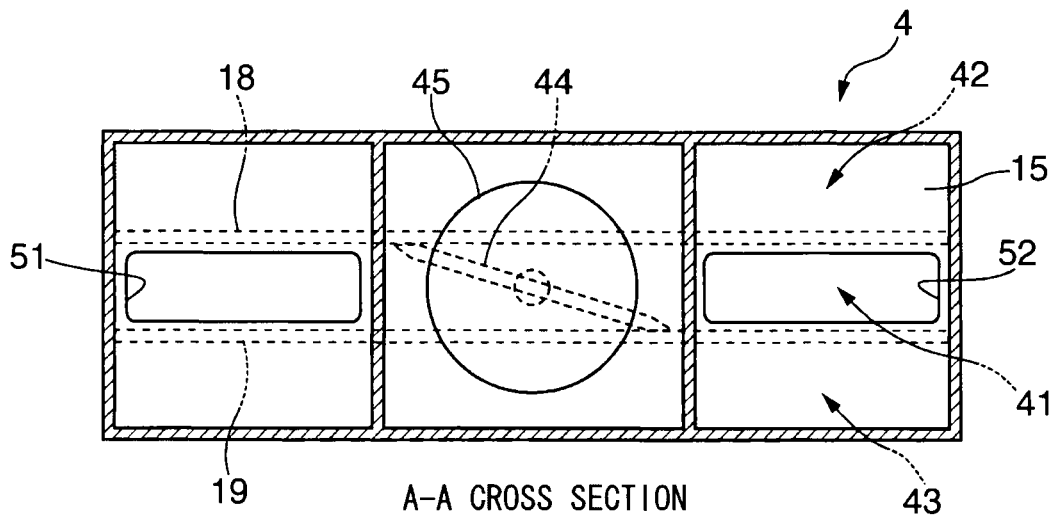
FIG. 8 is a cross-sectional diagram broken along line A-A of FIG. 7A and shows one rib of a casing that is an air intake opening portion of a flow path switching unit.
Figure 9:
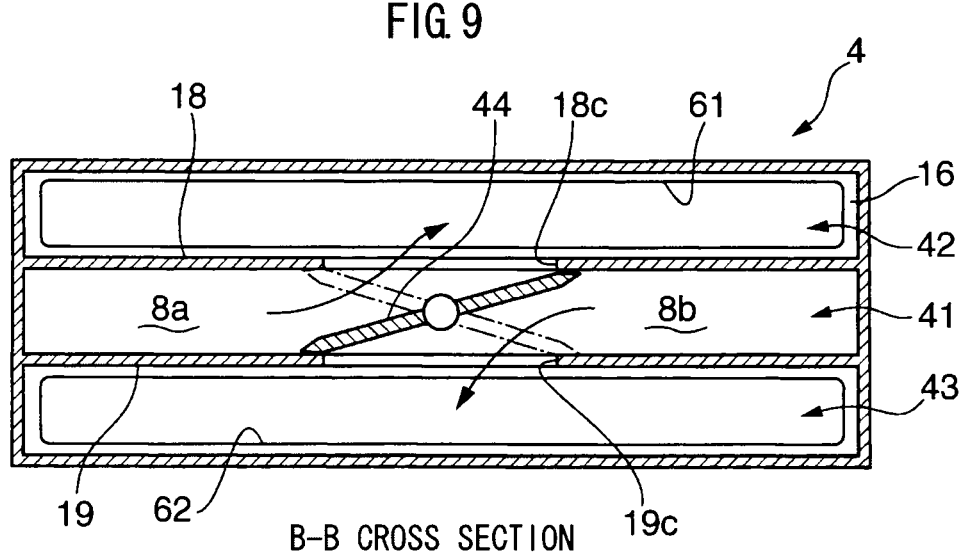
FIG. 9 is a cross-sectional diagram broken along line B-B of FIG. 7A and shows the internal structure of the flow path switching unit.
Figure 10:
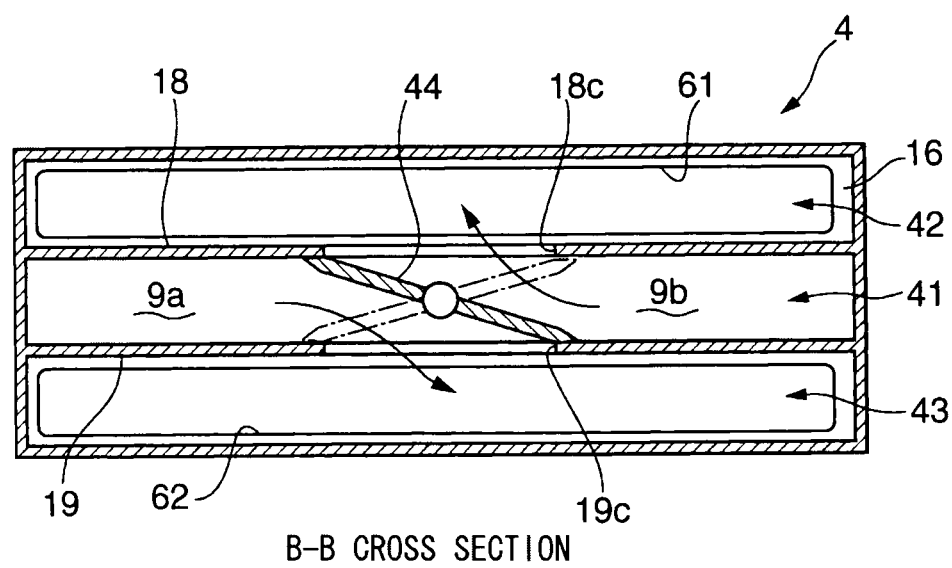
FIG. 10 is a cross-sectional diagram broken along line B-B of FIG. 7A and shows the internal structure of the flow path switching unit.

Embodiments of a vehicle dehumidifying/humidifying device pertaining to the present invention will be described on the basis of the drawings. FIGS. 1A and 1B are block diagrams respectively showing configural examples of a vehicle dehumidifying/humidifying device pertaining to a first aspect and a second aspect of the present invention. FIGS. 2A and 2B are block diagrams showing configural examples of vehicle dehumidifying/humidifying devices pertaining to a third aspect of the present invention. FIG. 3 is a block diagram showing a configural example of a vehicle dehumidifying/humidifying device pertaining to a fourth aspect of the present invention. FIG. 4 is a perspective diagram showing one example of an adsorbent module that is used in the vehicle dehumidifying/humidifying device of the present invention, and FIG. 5 is a perspective diagram showing another example of the adsorbent module. FIG. 6 is a water vapor adsorption isotherm showing an adsorption characteristic of an adsorbent that is suitable for the vehicle dehumidifying/humidifying device of the present invention. FIGS. 7A and 7B are a plan diagram and a side diagram showing partially broken views of a structural example of the vehicle dehumidifying/humidifying device of the configuration of FIG. 2A. FIG. 8 is a cross-sectional diagram broken along line A-A of FIG. 7A and shows one rib of a casing that is an air intake opening portion of a flow path switching unit. FIG. 9 and FIG. 10 are cross-sectional diagrams broken along line B-B of FIG. 7A and show the internal structure of the flow path switching unit. It will be noted that, in the description of the embodiment below, the vehicle dehumidifying/humidifying device will be abbreviated as "dehumidifying/humidifying device".

The dehumidifying/humidifying device of the present invention is a dehumidifying/humidifying device that dehumidifies and humidifies air inside a vehicle cabin and is used in order to supply dehumidified air for defogging to a window and supply humidified air to a passenger in winter, for example, when the outside air is dry. Further, by changing the actuation settings of a blower, a heater and a flow path switching unit described later, the dehumidifying/humidifying device can also supply dehumidified air to a passenger in summer when the outside air becomes humid. Moreover, the dehumidifying/humidifying device of the present invention can be incorporated as part of an air conditioner for cooling and heating, and its outer shape can be designed in a thin box-like shape so that the device can also be installed in a ceiling portion or the like inside a cabin.

The dehumidifying/humidifying device of the present invention can, because of its four aspects whose basic structures differ, accommodate various shapes and sizes of vehicle cabin interiors, and, as the aforementioned four aspects, there can be cited the first aspect shown in FIG. 1A, the second aspect shown in FIG. 1B, the third aspect shown in FIGS. 2A and 2B, and the fourth aspect shown in FIG. 3. These will be sequentially described below.

First, the dehumidifying/humidifying device pertaining to the first aspect of the present invention shown in FIG. 1A will be described. The dehumidifying/humidifying device shown in FIG. 1A is a device with the simplest configuration of a system that alternately blows dehumidified air and humidified air, and the dehumidifying/humidifying device is configured by housing a blower (2) and an adsorbent module (3) in a casing (not shown) that serves as an air flow path in which a first suction/blow-out opening and a second suction/blow-out opening are disposed. The shape of the casing is not particularly limited, and inside the casing, there is configured an air flow path that leads from the first suction/blow-out opening to the second suction/blow-out opening. Additionally, the blower (2) and the adsorbent module (3) are sequentially disposed inside the casing, that is, in the air flow path.

Although it is not shown, the first suction/blow-out opening is, for example, connected to an existing DEF blow-out opening or a new DEF blow-out opening disposed in a dashboard, a ceiling portion or a seat, and the other second suction/blow-out opening is, for example, connected to an existing FACE center blow-out opening or a new FACE blow-out opening disposed in a dashboard, a ceiling portion or a seat. The blower (2) is a blower that is capable of forward and reverse rotation, and ordinarily a DC centrifugal fan is used as such a blower. The number of rotations of such a centrifugal fan is about 3000 to 6000 rpm, the maximum static pressure is about 100 to 300 Pa, and the maximum air flow is about 0.1 to 0.5 $m^3$ per minute.

In the present invention, in order to make the device compact, there is used the adsorbent module (3) that is configured by a fixed adsorbing element and performs desorbing operation by direct heating. That is, the adsorbent module (3) is configured by an adsorbing element (30) comprising an adsorbent carried in an aeratable element (32) (see FIG. 4 and FIG. 5) and a heater (31) that is directly disposed on a non-aeration surface of the adsorbing element. Additionally, the adsorbent module (3) is disposed inside the casing such that air that is blown by the blower (2) (air to undergo processing) and air that is sucked by the blower (2) (air to undergo processing) is capable of passing through the adsorbing element (30).

The adsorbent module (3) may be formed in a cuboid as shown in FIG. 4 and FIG. 5 or may be formed in a shape having a curved surface depending on the structure of the casing. Further, in the adsorbent module (3), the adsorbing element (30) is configured by housing the element (32) in a metal casing so that heat is efficiently transmitted from the heater (31) to the element (32). It suffices for the heater (31) to be disposed such that the heat generated by the heater travels by heat conduction to the adsorbing element (30) without an air layer or other heat insulating element being intervened therebetween, and the heater (31) may also be disposed via a heat conducting material such as silver paste or grease.

In the present invention, in order to make the adsorbent module (3) compact, there is used a flat heater whose plate surface functions as a heat releasing component or a sheet heater (e.g., a silicon rubber heater, a PTC heater or a ceramic heater).

The power consumption of the heater (31) is 1.4 to 200 W. In the dehumidifying/humidifying device of the present invention, when designing the heater (31), a heat release capacity ($W_1$) demanded of the heater is calculated on the basis of the following expression.

$$\text{Heat release capacity}(W_1) = [(\text{specific enthalpy of humidified air}[kJ/kg(DA)]) - (\text{specific enthalpy of inlet air}[kJ/kg(DA)])] \times (\text{air density}[kg(DA)/m^3]) \times (\text{air flow of dehumidified air } [m^3/h]) \quad \text{[Equation 1]}$$

The unit symbol kg (DA) in the above expression represents 1 kg of dry air.

As the element (32), elements of various structures can be used as long as they can be made compact, ensure a large adsorption area and hold a large amount of powder adsorbent. Examples of the structure of the element (32) may include a so-called corrugated structure such as shown where the shapes of the openings of its aeration cells are formed in substantially triangular shapes by corrugated base material sheets, a honeycomb structure where the shapes of the openings of its aeration cells are formed in substantially hexagonal shapes, and a lattice structure where the shapes of the openings of its aeration cells are formed in quadrangular shapes.

For example, the corrugated element (32) is, as shown in FIG. 4, an element where numerous aeration cells are configured by alternately stacking base material sheets formed in a substantially corrugated shape and base material sheets formed in a substantially flat shape. That is, the element (32) of the adsorbing element (30) has a structure where honeycomb sheets, in each of which one row of cells is formed as a result of a corrugated base material sheet being superimposed on a flat base material sheet, are plurally adjacently disposed parallel to the plate surface of the heater (31), and the aeration cells are formed such that the shapes of the openings on end surface sides of the element (both end surface sides in an aeration direction) are substantially triangular as a result of convex portions of the corrugated base material sheets and the adjacent flat base material sheets being joined together.

Further, the corrugated element (32) may also be configured as shown in FIG. 5. The element (32) shown in FIG. 5 has a structure where honeycomb sheets, in each of which one row of cells is formed as a result of a corrugated base material sheet being superimposed on a flat base material sheet, are plurally adjacently disposed in a state where the honeycomb sheets are orthogonal to the plate surface of the heater (31). As described above, when an element where the honeycomb sheets of the element (32) are disposed vertically with respect to the plate surface of the heater (31) is used as the adsorbing element (30), heat of the heater (31) can be uniformly and efficiently transmitted with respect to the honeycomb sheets configuring the element (32).

The honeycomb sheets used in the element (32) of the adsorbing element (30) shown in FIG. 4 and FIG. 5 can be manufactured by a so-called honeycomb forming machine that alternately stacks two types of base material sheets with different lengths and joins them together at constant intervals while drawing the longer base material sheets; in that case, the flat base material sheets and the corrugated base material sheets that are adjacent are joined together by thermal welding, ultrasonic welding, or adhesion using an adhesive. Additionally, the element (32) is manufactured by manufacturing, by a method such as described above, corrugated honeycomb sheets, for example, comprising ceramic paper or the like as base material sheets, stacking the honeycomb sheets to manufacture a structure body of the element, and thereafter immersing the structure body in a slurry comprising an adsorbent, a binder and a solvent. It will be noted that the honeycomb sheet manufacturing method itself is publicly known and disclosed in, for example, JP-A No. 2004-209420.

In the present invention, it is preferable for the adsorbent carried in the element (32) of the adsorbing element (30) to have an adsorption characteristic such as described below in order to sufficiently dehumidify air that is to be blown out for window defogging and effectively humidify air that is to be blown out toward a passenger in winter, for example.

That is, assuming that the temperature of the air circulating inside the vehicle cabin during heating in winter is 25° C., the relative humidity thereof is a relatively low humidity of about 25 to 50%, and in order to achieve a defogging effect with respect to a window of a low temperature of 5° C., for example, by the air that is blown out, it is necessary for the adsorbent to have the characteristic that the adsorbent can sufficiently adsorb water even in such a low humidity as described above and can also reduce the relative humidity of the air that is blown out to about 20% or less.

On the other hand, in regenerating the adsorbent, the heater (31) is used, and in order to reduce power consumption, it is necessary for the adsorbent to be able to desorb water at a temperature of 90° C. or lower and preferably at a relatively low temperature of 70° C. or lower. Additionally, when the inside of the vehicle cabin is in a moderately comfortable state, such as a temperature of 25° C. and a humidity of 50%, for example, the relative humidity when air passing through the element (32) has been heated to 90° C. by the heater (31) becomes 2%, and the relative humidity when air passing through the element (32) has been heated to 70° C. by the heater (31) becomes 4%. Consequently, it is desirable for the adsorbent to have the characteristic that the adsorbent can easily adsorb and desorb water in a range where the relative humidity is 2 to 25% and preferably a range of 4 to 25%.

Further, the adsorption and desorption amount required of the adsorbent is as described next. That is, when the air inside the vehicle cabin is to be supplied to a window for defogging, usually about 120 m³ of air per hour is blown out. At that time, assuming that the temperature of the window is 5° C., in order to prevent condensation on the window, it is preferable for the air that is blown out to be dehumidified to equal to or less than the absolute humidity in a saturated state of 5° C., or equal to or less than about 5 g/kg. Additionally, assuming, as mentioned before, that the temperature of the air inside the cabin is 25° C. and that the humidity of the air inside the cabin is 50%, then the absolute humidity of this air is 9.8 g/kg, so it is necessary for 120 m³ of air per hour (=15.5 kg/h) to be dehumidified equal to or greater than 4.8 g/kg. Consequently, it is preferable for the adsorbent to be able to adsorb 750 g of water per hour, for example.

Moreover, in order to humidify the air inside the vehicle cabin and supply the humidified air to a passenger without imparting a feeling of discomfort to the passenger, for example, blowing air at a wind velocity of 1 to 2 m/s and an air flow of 4.7 m³/h is supposed. At that time, when the temperature of the air that is sucked in is 20° C., the relatively humidity is 30% and the absolute humidity is 4.35 g/kg (DA), in order to blow out humidified air whose temperature is 25° C., whose relative humidity is 40% and whose absolute humidity is 7.91 g/kg (DA) toward the passenger, it is necessary to raise the absolute humidity 1.82 g/kg (DA), and at the above-described air flow, the air must be humidified a water amount of 10.3 g/h.

On the other hand, in actuating the adsorbent module (3), as described later, the adsorbing operation and the desorbing operation by the adsorbing element (30) are alternately switched between, and assuming that the number of times that switching between the adsorbing and desorbing operations occurs is 12 times per hour, in one-time adsorbing operation and desorbing operation of the adsorbing element (30), it is necessary for about 0.85 g of water to be adsorbed and desorbed by the adsorbent. Moreover, in terms of practicality, it is necessary to make the adsorbing element (30) compact in order to incorporate it into an even more compact casing, and when the effective volume in the element (32) (apparent volume in a state where the element is carrying the adsorbent) is designed to be 35 cm³, the mass of the adsorbent that can be carried in the element (32) becomes about 6 g. Consequently, an adsorption and desorption amount of at least 0.14 g/g is demanded of the adsorbent.

That is, in the present invention, it is necessary for the adsorbent carried in the adsorbing element (30) of the adsorbent module (3) to have an adsorption characteristic where the difference between its adsorption amount at a relative humidity of 25% and its adsorption amount at a relative humidity of 2% in a water vapor adsorption isotherm of 25° C. is equal to or greater than 0.14 g/g. Preferably, it is necessary for the adsorbent to have an adsorption characteristic where the difference between its adsorption amount at a relative humidity of 25% and its adsorption amount at a relative humidity of 4% is equal to or greater than 0.14 g/g.

In the present invention, examples of adsorbents that satisfy the above-described characteristic may include zeolites, which can easily adsorb water vapor in low humidity and can easily desorb water vapor in a low temperature. Examples of such zeolites may include FAU or other aluminosilicates whose silica-to-alumina ratio is equal to or greater than 2.5 and aluminophosphates; in particular, crystalline aluminophosphates including at least Al and P in a framework structure are preferable. From the standpoint of raising the diffusion of water vapor in the individual particles of the adsorbent, the size (average particle diameter) of the particles of the adsorbent is ordinarily 0.1 to 300 μm, preferably 0.5 to 250 μm, more preferably 1 to 200 μm, and most preferably 2 to 100 μm.

The above-described aluminophosphates (hereinafter appropriately abbreviated as "ALPO") are crystalline aluminophosphates assigned by the International Zeolite Association (IZA). The atoms that configure the framework structures of crystalline aluminophosphates are aluminium and phosphorous, and other atoms may be substituted for some of those atoms. Among these, in terms of their adsorption characteristic, preferred are: (I) an Me-aluminophosphate where a heteroatom Me1 (where Me1 is at least one type of element that belongs to the third or fourth period of the periodic table and is selected from elements in Group 2A, Group 7A, Group 8, Group 1B, Group 2B and Group 3B (excluding Al)) is substituted for some aluminium; (II) an Me-aluminophosphate where a heteroatom Me2 (where Me2 is a Group 4B element belonging to the third or fourth period of the periodic table) is substituted for phosphorous; or (III) an Me-aluminophosphate where heteroatoms Me1 and Me2 are respectively substituted for both aluminium and phosphate.

One type or two or more types of Me may be included. Preferable Me (Me1, Me2) are elements that belong to the third and fourth period of the periodic table. Me1 preferably has an ionic radius equal to or greater than 0.3 nm and equal to or less than 0.8 nm in a divalent state and more preferably has an ionic radius equal to or greater than 0.4 nm and equal to or less than 0.7 nm in a divalent 4-coordinate state. Among these, in terms of the ease of synthesis and its adsorption characteristic, it is preferable for Me1 to be at least one type of element selected from Fe, Co, Mg and Zn and particularly preferable for Me1 to be Fe. Me2 is a Group 4B element belonging to the third or fourth period of the periodic table and is preferably Si.

Further, as the above-described aluminophosphates, ordinarily aluminophosphates whose framework density (FD) is equal to or greater than 13 T/nm³ and equal to or less than 20 T/nm³ are used. The lower limit of the framework density is preferably equal to or greater than 13.5 T/nm³ and more preferably equal to or greater than 14 T/nm³. The upper limit of the framework density is preferably equal to or less than 19 T/nm³. When the framework density is below the above-described range, there is a tendency for the structure to become unstable and durability drops. On the other hand, when the framework density exceeds the above-described range, the adsorption capacity becomes smaller and the adsorbent becomes unsuitable for use. It will be noted that "framework density" (unit: T/nm³) means the number of T atoms (number of elements configuring the framework other than oxygen per 1 nm³ of a zeolite) present per unit volume (nm³).

Examples of the structures of the aluminophosphates may, when represented by the codes assigned by the IZA, include AEI, AEL, AET, AFI, AFN, AFR, AFS, AFT, AFX, ATO, ATS, CHA, ERI, LEV and VFI. Among these, in terms of their adsorption characteristic and durability, aluminophosphates having an AEI, AEL, AFI, CHA or LEV structure are preferable, and aluminophosphates having an AFI or CHA structure are particularly preferable.

As the adsorbent, among the aluminophosphates such as described above, SAPO-34 and FAPO-5 are particularly preferable. Further, one type or two or more types of ALPO can also be combined and used. It will be noted that the manufacturing conditions of FAPO and SAPO are not particularly limited, and ordinarily FAPO and SAPO are manufactured by mixing together, and thereafter hydrothermally synthesizing, an aluminium source, a phosphorous source, an ME source such as Si or Fe as needed, and a template. Further, ALPO can be synthesized utilizing publicly known synthesizing methods described in, for example, JP-B No. 1-57041, JP-A No. 2003-183020 and JP-A No. 2004-136269.

In this connection, adsorbents suitable for the dehumidifying/humidifying device of the present invention, such as, for example, crystalline silicoaluminophosphate (SAPO-34), have an adsorption characteristic such as represented by the solid line in FIG. 6 where, in a water vapor adsorption isotherm of 25° C., the adsorption amount drastically changes between a relative humidity of 2% and a relative humidity of 25%, and the difference ($\delta_1$) thereof is equal to or greater than 0.15 g/g. In contrast, conventional adsorbents, such as, for example, A-type silica gel or activated carbon, have an adsorption characteristic such as represented by the dotted line in FIG. 6 where, in a water vapor adsorption isotherm of 25° C., the change in the adsorption amount is small between a relative humidity of 2% and a relative humidity of 25%, and the difference ($\delta_2$) thereof is about ½ or less that of SAPO-34. That is, the adsorbent applied in the present invention has the characteristic that the adsorbent adsorbs and desorbs more water in a low humidity range.

Further, in the adsorbent module (3), it is preferable for a total opening area orthogonal to an aeration direction of the adsorbing element (30) to be set to be equal to or greater than a minimum cross-sectional area (opening area orthogonal to aeration direction) of the flow path on an upstream side and a downstream side of the adsorbent module (3). Specifically, the adsorbent module (3) may be formed in a width that is larger than the width of the portion of the casing (1) that houses the blower (2) and a flow path switching unit (4). Further, the adsorbent module (3) may be formed thicker than the thickness of the portion of the casing (1) that houses the blower (2) and the flow path switching unit (4). When the aeration area of the adsorbing element (30) is set as described above, the flow velocity of the air passing through the inside of the adsorbing element (30) can be reduced, and the adsorbing and desorbing functions of the adsorbing element (30) can be further raised.

Further, in the dehumidifying/humidifying device of the present invention, in order to facilitate maintenance, the adsorbing element (30) of the adsorbent module (3) is configured to be replaceable. Specifically, the adsorbent module (3) is housed in the casing in a state where the adsorbing element (30) is tightly adhered, but without being fixed, to the heater (31). Additionally, the adsorbing element (30) is configured to be removable by opening a cover (not shown) disposed on the casing. Thus, just the adsorbing element (30) can be replaced when its adsorption capability has dropped or the like.

The dehumidifying/humidifying device of the present invention is configured such that, for example, in order to blow out air that has been dehumidified toward a window and blow out air that has been humidified toward a passenger, by controlling the powered state (e.g., powered/not powered) of the heater (31) of the adsorbent module (3) and switching the rotational direction of the blower (2) in accordance with the powered state of the heater (31), the dehumidifying/humidifying device blows out air that has been dehumidified from the first suction/blow-out opening and blows out air that has been humidified from the second suction/blow-out opening.

It will be noted that, although it is not shown, the dehumidifying/humidifying device of the present invention is configured to use a separately disposed control unit to control the rotation of the blower (2) and control the powering of the heater (31) in the adsorbent module (3). Further, in the present invention, various methods by which the control unit can switch between heating and non-heating operation with respect to the adsorbing element (30) can be utilized as the method of controlling the powered state of the heater (31), such as a method where the control unit switches between powering/not-powering the heater (31), a method where the control unit gradually varies the supply of electrical power to the heater (31) at constant time intervals set beforehand, or a method where the control unit varies the supply of electrical power to the heater (31) in accordance with the humidity inside the cabin that has been detected by a humidity sensor.

The dehumidifying/humidifying device of the present invention operates as described below in winter when the outside air is dry, for example. That is, initially, the blower (2) rotates in one direction to thereby suck in the air inside the cabin from the second suction/blow-out opening (the right side of FIG. 1A) and introduce the air that is sucked in to the adsorbing element (30) of the adsorbent module (3). At that time, in the adsorbent module (3), power to the heater (31) is cut off by circuit control resulting from the control unit, and the adsorbing element (30) is held at room temperature. Consequently, the adsorbent carried in the adsorbing element (30) exhibits an adsorbing function and removes water vapor from the air passing through the element (32). As a result, the air that has been dehumidified is blown out from the first suction/blow-out opening (the left side of FIG. 1A).

In the adsorbent module (3), when the above-described adsorbing operation is performed for a certain amount of time, such as 30 to 1800 seconds, next, the heater (31) is powered by circuit control resulting from the control unit, and the heater (31) emits heat. Further, the rotational direction of the blower (2) is switched by circuit control resulting from the control unit in accordance with the powering of the heater (31), and the blower (2) rotates in the other direction. Because of this rotation, the blower (2) sucks in the air inside the cabin from the first suction/blow-out opening and blows the air to the adsorbing element (30) of the adsorbent module (3). At that time, in the adsorbent module (3), the adsorbing element (30) is being heated by the heater (31), so the adsorbent carried in the adsorbing element (30) exhibits a desorbing function, desorbs the water vapor that it has adsorbed until then, and releases the water vapor into the air passing through the element (32). As a result, the air that has been humidified is blown out from the second suction/blow-out opening. It will be noted that the dehumidifying/humidifying device again performs initial running operation after it has performed the desorbing operation in the adsorbent module (3) for a certain amount of time.

That is, the dehumidifying/humidifying device shown in FIG. 1A repeats the operation of switching and controlling the powered state (powered/not powered) of the heater (31) at a certain timing to switch the adsorbing and desorbing operations of the adsorbing element (30) and switching the rotational direction of the blower (2) in accordance with the powered state of the heater (31), whereby the dehumidifying/humidifying device can intermittently blow out air that has been dehumidified from the first suction/blow-out opening and can intermittently blow out air that has been humidified from the second suction/blow-out opening. Additionally, the dehumidifying/humidifying device can use the air that has been dehumidified to defog a window and can use the air that has been humidified to improve comfort.

As described above, in the dehumidifying/humidifying device of the present invention, the adsorbent module (3) is configured by directly disposing the heater (31) on the fixed adsorbing element (30), and when the water in the adsorbent is to be desorbed, the adsorbing element (30) is directly heated by heat conduction by the heater (31), so it is not necessary to dispose a rotating member drive mechanism as in a conventional adsorption rotor system, and, moreover, the device has excellent thermal efficiency and the adsorbing element (30) and the heater (31) can be made even more compact. That is, according to the present invention, the device configuration can be simplified and the device overall can be made even more compact. Further, in the dehumidifying/humidifying device of the present invention, the flow of air in the adsorbent module (3) is reversed by switching the desorbing and adsorbing operations, so the performance of the adsorbent can be sufficiently exhibited across the entire element (32) of the adsorbing element (30).

Next, the dehumidifying/humidifying device pertaining to the second aspect of the present invention shown in FIG. 1B will be described. The dehumidifying/humidifying device shown in FIG. 1B is, like the first aspect, a device of a system that alternately blows dehumidified air and humidified air, and the dehumidifying/humidifying device is configured by housing a blower (2), an adsorbent module (3) and a flow path switching unit (4) in a casing (not shown) that serves as an air flow path in which a suction opening, a first blow-out opening and a second blow-out opening are disposed. The shape of the casing is not particularly limited, and inside the casing, there is configured an air flow path that leads from the suction opening to the first blow-out opening and the second blow-out opening (two blow-out openings that are disposed adjacent to each other). Additionally, the blower (2), the adsorbent module (3) and the flow path switching unit (4) are sequentially disposed inside the casing, that is, in the air flow path.

Although it is not shown, the first blow-out opening is, for example, connected to an existing DEF blow-out opening or a new DEF blow-out opening disposed in a dashboard, a ceiling portion or a seat, and the other second blow-out opening is, for example, connected to an existing FACE center blow-out opening or a new FACE blow-out opening disposed in a dashboard, a ceiling portion or a seat. Ordinarily a DC centrifugal fan is used as the blower (2). The number of rotations of such a centrifugal fan is about 3000 to 6000 rpm, the maximum static pressure is about 100 to 300 Pa, and the maximum air flow is about 0.1 to 0.5 m³ per minute. The adsorbent module (3) is the same as that of the first aspect and is disposed inside the casing such that air that is blown by the blower (2) is capable of passing through the adsorbing element (30).

The dehumidifying/humidifying device shown in FIG. 1B uses the blower (2) that always rotates in one direction, so the flow path switching unit (4) is disposed on the downstream side of the adsorbent module (3). That is, the flow path switching unit (4) is for selecting the blow-out opening of the dehumidified air and the humidified air and is configured to be capable of switching the application destination of air that has passed through the adsorbing element (30) of the adsorbent module (3) to the first blow-out opening or the second blow-out opening.

Specifically, the flow path switching unit (4) is configured by part of the casing, a partition plate or a rib that partitions part of the casing, and a damper, and the flow path switching unit (4) is equipped with one air introduction opening and first and second (two) outflow openings. The introduction opening is an opening into which air that has passed through the adsorbing element (30) is introduced (an opening on the left side of the flow path switching unit (4) in the drawing), the first outflow opening is an opening (for example, an opening on an upper level side of the flow path switching unit (4) in the drawing) that leads to the first blow-out opening in the casing through which the dehumidified air, for example, is blown out, and the second outflow opening is an opening (for example, an opening on a lower level side of the flow path switching unit (4) in the drawing) that leads to the second blow-out opening in the casing through which the humidified air, for example, is blown out.

The damper of the flow path switching unit (4) is disposed between the introduction opening and the two outflow openings, is pivotally supported so as to be pivotable between the first outflow opening and the second outflow opening, and is configured such that its end portion on the introduction opening side is swung up and down, for example, by an actuator such as a stepping motor. Consequently, in the flow path switching unit (4), when, for example, the damper is positioned above (the state shown in the drawing), the first outflow opening is closed and air that has passed through the introduction opening is guided to the second blow-out opening, and when, for example, the damper is positioned below, the second outflow opening is closed and air that has passed through the introduction opening is guided to the first blow-out opening.

The dehumidifying/humidifying device of the present invention is configured such that, for example, in order to blow out air that has been dehumidified toward a window and blow out air that has been humidified toward a passenger, by controlling the powered state (e.g., powered/not powered) of the heater (31) of the adsorbent module (3) and switching the flow path switching unit (4) in accordance with the powered state, the dehumidifying/humidifying device blows out air that has been dehumidified from the first blow-out opening and blows out air that has been humidified from the second blow-out opening. It will be noted that, in the device of FIG. 1B also, like the first aspect, actuation of the blower (2), the heater (31) and the flow path switching unit (4) is controlled by a separately disposed control unit.

The dehumidifying/humidifying device of the present invention operates as described below in winter when the outside air is dry, for example. That is, initially, the blower (2) sucks in the air inside the cabin from the suction opening in the casing (the left side of FIG. 1B) and blows the air to the adsorbing element (30) of the adsorbent module (3). In the adsorbent module (3), power to the heater (31) is cut off by circuit control resulting from the control unit, and the adsorbing element (30) is held at room temperature. Consequently, the adsorbent carried in the adsorbing element (30) exhibits an adsorbing function and removes water vapor from the air passing through the element (32). Then, when the dehumidified air that has been obtained as a result of the air passing through the adsorbing element (30) is blown to the flow path switching unit (4), the flow path switching unit (4) guides the air flowing in from the introduction opening to the first outflow opening because the damper is initially positioned below. As a result, the air that has been dehumidified is blown out from the first blow-out opening in the casing.

In the adsorbent module (3), when the above-described adsorbing operation is performed for a certain amount of time, such as 30 to 1800 seconds, next, the heater (31) is powered by circuit control resulting from the control unit, and the heater (31) emits heat. Further, the flow path switching unit (4) is switched by circuit control resulting from the control unit in accordance with the powering of the heater (31). That is, in the flow path switching unit (4), the damper is positioned above and the first outflow opening is closed.

In a state where the flow path switching unit (4) has been switched as described above, when air is blown from the blower (2) to the adsorbing element (30) of the adsorbent module (3), in the adsorbent module (3), the adsorbing element (30) is being heated by the heater (31), so the adsorbent carried in the adsorbing element (30) exhibits a desorbing function, desorbs the water vapor that it has adsorbed until then, and releases the water vapor into the air passing through the element (32). Then, when the humidified air that has been obtained as a result of the air passing through the adsorbing element (30) is blown to the flow path switching unit (4), the flow path switching unit (4) guides the air flowing in from the introduction opening to the second outflow opening because the damper is positioned above. As a result, the air that has been humidified is blown out from the second blow-out opening in the casing.

That is, the dehumidifying/humidifying device shown in FIG. 1B repeats the operation of switching and controlling the powered state (e.g., powered/not powered) of the heater (31) at a certain timing to switch the adsorbing and desorbing operations of the adsorbing element (30) and switching the flow path switching unit (4) in accordance with the powered state of the heater (31), whereby the dehumidifying/humidifying device can intermittently blow out air that has been dehumidified from the first blow-out opening and can intermittently blow out air that has been humidified from the second blow-out opening. In other words, the dehumidifying/humidifying device can alternately blow out air that has been dehumidified and air that has been humidified. Additionally, the dehumidifying/humidifying device can use the air that has been dehumidified to defog a window and can use the air that has been humidified to improve comfort.

As described above, the dehumidifying/humidifying device of the present invention, like the first aspect, uses the adsorbent module (3) that has a specific structure, so it is not necessary to dispose a rotating member drive mechanism as in a conventional adsorption rotor system, and, moreover, the device has excellent thermal efficiency and the adsorbing element (30) and the heater (31) can be made even more compact. Additionally, the device configuration can be simplified and the device overall can be made even more compact.

Next, the dehumidifying/humidifying devices pertaining to the third aspect of the present invention shown in FIGS. 2A and 2B will be described. The dehumidifying/humidifying devices shown in FIGS. 2A and 2B are devices of a system that simultaneously and continuously blows dehumidified air and humidified air, and the dehumidifying/humidifying devices are configured by housing a blower (2), a pair of first and second adsorbent modules (3a) and (3b) and a flow path switching unit (4) in a casing (whose specific structure will be described later) that serves as an air flow path in which a suction opening, a first blow-out opening and a second blow-out opening are disposed. The shape of the casing is not particularly limited, and inside the casing, there is configured an air flow path that leads from the suction opening to the first blow-out opening and the second blow-out opening (two blow-out openings that are disposed adjacent to each other). Additionally, the blower (2), the adsorbent modules (3) and the flow path switching unit (4) are sequentially disposed inside the casing, that is, in the air flow path.

Although it is not shown, the first blow-out opening is, for example, connected to an existing DEF blow-out opening or a new DEF blow-out opening disposed in a dashboard, a ceiling portion or a seat, and the other second blow-out opening is, for example, connected to an existing FACE center blow-out opening or a new FACE blow-out opening disposed in a dashboard, a ceiling portion or a seat. The blower (2) and each of the adsorbent modules (3) are the same as those of the second aspect, and the adsorbent modules (3) are disposed inside the casing such that air that is blown by the blower (2) is capable of passing in parallel through the adsorbing elements (30) of each of the adsorbent modules (3a) and (3b).

In the dehumidifying/humidifying devices shown in FIGS. 2A and 2B also, like the second aspect, the flow path switching unit (4) is disposed on the downstream side of the adsorbent modules (3). Moreover, the flow path switching unit (4) is configured to be capable of applying, and capable of switching the application destination of, air that has passed through the adsorbing elements (30) of each of the adsorbent modules (3) to the first and second blow-out openings (or the second and first blow-out openings). Additionally, the dehumidifying/humidifying devices shown in FIGS. 2A and 2B are configured such that, by switching the powered state (e.g., powered/not powered) of the heater (31) of the first adsorbent module (3a) and the powered state (e.g., powered/not powered) of the heater (31) of the second adsorbent module (3b) and switching the flow path switching unit (4) in accordance with the powered states, the dehumidifying/humidifying devices blow out air that has been dehumidified from the first blow-out opening and blow out air that has been humidified from the second blow-out opening.

The humidifying device shown in FIG. 2A and the humidifying device shown in FIG. 2B have the same structure except that the number of blowers (2) differs. In other words, the humidifying device shown in FIG. 2A is configured such that two of the blowers (2) are disposed in correspondence to the first and second adsorbent modules (3a) and (3b), and the humidifying device shown in FIG. 2B is configured such that one shared blower (2) blows air with respect to the first and second adsorbent modules (3a) and (3b). Below, the structure of the device shown in FIG. 2A will be described more specifically on the basis of FIG. 7A to FIG. 10 as a structural example of the dehumidifying/humidifying device pertaining to the third aspect.

The dehumidifying/humidifying device pertaining to the third aspect is, as shown in FIGS. 7A and 7B, configured by sequentially housing, along the air flow direction, the blowers (2), the adsorbent modules (3) and the flow path switching unit (4) in a casing (1) that serves as a flow path through which air flows. The casing (1) can be designed in various shapes depending on the installation location, but in order to install the casing (1) in, for example, a ceiling as mentioned before, the casing (1) is formed in a flat substantially cuboid box-like shape whose thickness portion corresponding to its height is designed thin. It will be noted that the casing (1) may also be formed such that its outer shape in its thickness direction, its length direction and its width direction is curved in accordance with the ceiling shape.

In the front end of the casing (1), there is disposed a suction opening (10) for sucking in the air inside the cabin, and in the rear end of the casing (1), there are disposed a first blow-out opening (11) for blowing out air that has been dehumidified and a second blow-out opening (12) for blowing out air that has been humidified. It will be noted that these blow-out openings (11) and (12) may have cross-sectional shapes configured by curves in order to reduce pressure loss. Further, inside the casing (1), there are disposed ribs (13), (14), (15) and (16) that sequentially partition the inside of the casing in accordance with the air flow direction in order to dispose the blowers (2) and the adsorbent modules (3) and configure the flow path switching unit (4).

Two of the blowers (2) are disposed in correspondence to the adsorbing elements (30) of the first and second adsorbent modules (3a) and (3b), and these are disposed on the left side and the right side with respect to the blowing direction. Ordinarily DC centrifugal fans are, like the preceding aspects, used as the blowers (2). The blowers (2) are disposed near the front end of the casing (1) as a result of being fixed via blower ducts (21) in aeration holes that are formed in the left side and the right side of the rib (13).

In the present invention, specific adsorbent modules (3) that are the same as those of each of the preceding aspects, which do not require a drive mechanism and whose thermal efficiency is high, are used as the first and second adsorbent modules (3a) and (3b). The first and second adsorbent modules (3a) and (3b) individually perform adsorbing and desorbing operations, so they are partitioned by a heat insulating plate (33) comprising a resin foam or an inorganic fiber molded body such that the heat of the heaters (31) does not travel to the adsorbing elements (30) of the adjacent modules.

The first and second adsorbent modules (3a) and (3b) are disposed between the rib (13), in whose left side and right side are formed the aeration holes, and the rib (14), in whose left side and right side are similarly formed aeration holes, and such that air that has passed through each of the aeration holes in the rib (13) respectively flows into the adsorbing elements (30) of the first and second adsorbent modules (3a) and (3b) and air that has passed through each of the adsorbing elements (30) passes through each of the aeration holes in the ribs (14).

The dehumidifying/humidifying device of the present invention continuously blows out air that has been dehumidified and air that has been humidified while alternately switching the adsorbing operation and the desorbing operation in the adsorbent modules (3). Consequently, in the present invention, as shown in FIGS. 7A and 7B, the flow path switching unit (4) is disposed on the downstream side of the adsorbent modules (3a) and (3b).

As the switching mechanism of the two flow paths, there can be used a mechanism that causes two flexible conduits to move to change their connection destinations, a mechanism that alternately opens and closes two shutters synchronously actuated by a link or the like to change their connection destinations, or a mechanism that causes two coaxial rotary shutters that are adjacent and, when seen from the side, orthogonal to each other to rotate 90 degrees at a time to change their connection destinations, but from the standpoint of simplifying the device configuration and making the device compact, there is used the flow path switching unit (4) exemplified in FIGS. 7A and 7B.

Specifically, the flow path switching unit (4) is configured by a directing chamber (41) into which flows air that has passed through the first adsorbent module (3a) and air that has passed through the second adsorbent module (3b), a first room (42) in the upper portion of the casing into which flows the air that has been directed, a second room (43) in the lower portion of the casing into which flows the air that has been directed, a damper (44) (see FIGS. 7A and 7B and FIG. 8) that switches the flow of air and an actuator (45) (see FIGS. 7A and 7B) that actuates the damper.

As shown in FIGS. 7A and 7B, the directing chamber (41), the first room (42) and the second room (43) are formed by the rib (15), the rib (16) that is downstream thereof, both sides walls, the ceiling and the bottom of the casing (1) and two partition plates (18) and (19) (see FIG. 7B and FIG. 8) that are disposed horizontally and vertically partition the space between the ribs (15) and (16) into three levels.

The directing chamber (41) is, as shown in FIG. 7B and FIG. 8, disposed in the middle portion in the thickness direction of the casing (1) and is configured such that air that has been blown from the adsorbing element (30) of the first adsorbent module (3a) to a first aeration path (40a) (see FIG. 7A) flows into the directing chamber (41) through a first introduction opening (51) (see FIG. 8) in the rib (15) and such that air that has been blown from the adsorbing element (30) of the second adsorbent module (3b) to a second aeration path (40b) (see FIG. 7A) flows into the directing chamber (41) through a second introduction opening (52) (see FIG. 8) in the rib (15).

The directing chamber (41) is a room that functions cooperatively with the damper (44) to direct the outflow destination of the air and, as shown in FIG. 7B and FIG. 8, is disposed between the first room (42) and the second room (43). Additionally, as shown in FIG. 8 and FIG. 9, a first inflow opening (18c) and a second inflow opening (19c) are disposed in the centers of the two partition plates (18) and (19) that vertically partition the space between the ribs (15) and (16) into three levels, and these inflow openings serve as inlets for air to enter the first room (42) and the second room (43). Further, a first outflow opening (61) and a second outflow opening (62) are respectively disposed in upper and lower portions of the rib (16) that correspond to the height of the first room (42) and the height of the second room (43), and these outflow openings serve as outlets for air to exit the first and second rooms (42) and (43).

That is, the first inflow opening (18c) and the second inflow opening (19c) that respectively lead to the rooms (42) and (43) are disposed in the directing chamber (41) and are configured such that air in the directing chamber (41) flows in. Moreover, the first outflow opening (61) and the second outflow (62) are respectively disposed in the first and second rooms (42) and (43), and the first blow-out opening (11) and the second blow-out opening (12) in the casing (1) are attached to these outflow openings. Additionally, they are configured such that air in each of the rooms (42) and (43) flows out from each of the blow-out openings (11) and (12).

The damper (44) is, as shown in FIG. 7A, FIG. 9 and FIG. 10, disposed in the center of the directing chamber (41), or in other words between the first inflow opening (18c) and the second inflow opening (19c), and is configured such that it can rotate a certain angle about an axis orthogonal to plate surfaces of the ribs (15) and (16). The damper (44) is actuated by the actuator (45), which is disposed on the opposite side (the upstream side) of the directing chamber (41) with respect to the rib (15), and the damper (44) can partition the directing chamber (41) into two spaces as a result of the left and right side edges of the damper contacting the partition plates (18) and (19) (see FIG. 9 and FIG. 10). It will be noted that, as the actuator (45), ordinarily a geared type stepping motor is used because it can cause the damper (44) to forwardly and reversely rotate a certain angle.

The directing chamber (41) is configured such that, as shown in FIG. 8 and FIG. 9, it is partitioned into a space (8a) that includes the first introduction opening (51) and the first inflow opening (18c) and a space (8b) that includes the second introduction opening (52) and the second inflow opening (19c) as a result of the damper (44) rotating in one direction and such that, as shown in FIG. 8 and FIG. 10, it is partitioned into a space (9a) that includes the first introduction opening (51) and the second inflow opening (19c) and a space (9b) that includes the second introduction opening (52) and the first inflow opening (18c) as a result of the damper (44) rotating in the other direction.

The dehumidifying/humidifying device of the present invention is configured such that, for example, in order to continuously blow out air that has been dehumidified from the first blow-out opening (11) and continuously blow out air that has been humidified from the second blow-out opening (12), the dehumidifying/humidifying device alternately switches powering with respect to the heaters (31) of each of the adsorbent modules (3a) and (3b) every certain amount of time, for example. Additionally, the dehumidifying/humidifying device is configured such that the flow path switching unit (4) switches the application destinations of air that has passed through the adsorbing element (30) of the first adsorbent module (3a) and air that has passed through the adsorbing element (30) of the second adsorbent module (3a) in accordance with the powered states (e.g., powered/not powered) with respect to the heaters (31).

That is, in each of the adsorbent modules (3), the heater (31) is powered in time intervals based on the adsorbing and desorbing operations of the adsorbing element (30), such as 30- to 1800-second intervals, to interchange the adsorbing function and the desorbing function in the adsorbing element (30). Moreover, in the first adsorbent module (3a) and the second adsorbent module (3b), the heaters (31) are powered alternately. Additionally, in the flow path switching unit (4), at the same time as the switching of power to the heaters (31) or after the elapse of a certain amount of time after the switching, the damper (44) is actuated to switch the application destinations of air that has been processed by each of the adsorbent modules (3) from the first blow-out opening (11) to the second blow-out opening (12) in one and from the second blow-out opening (12) to the first blow-out opening (11) in the other.

The timing when the flow path switching unit (4) is actuated is after the currents to the heaters (31) are switched to until the surface temperatures of the heaters (31) change from high to low and is ordinarily until 30 to about 60 seconds have elapsed after the switching of the currents. By actuating the damper (44) after the elapse of a certain amount of time to switch the application destinations in this manner, dehumidified air and humidified air can be generated even more efficiently. It will be noted that, in the device of FIG. 2A also, like the second aspect, actuation of the blowers (2), the heaters (31) and the flow path switching unit (4) is controlled by a separately disposed control unit.

The dehumidifying/humidifying device of the present invention operates as described below in winter when the outside air is dry, for example. That is, the blowers (2) suck in the air inside the cabin from the suction opening (10) and respectively blow the air to the adsorbing element (30) of the first adsorbent module (3a) and the adsorbing element (30) of the second adsorbent module (3b).

At that time, for example, in the first adsorbent module (3a), power to the heater (31) is cut off by circuit control resulting from the control unit, and the adsorbing element (30) is held at room temperature. Consequently, the adsorbent carried in the adsorbing element (30) exhibits an adsorbing function and removes water vapor from the air passing through the element (32). On the other hand, while the adsorbing operation is performed in the first adsorbent module (3a), in the second adsorbent module (3b), the heater (31) is powered by circuit control resulting from the control unit, the heater emits heat, and the adsorbing element (30) is heated. Thus, the adsorbent carried in the adsorbing element (30) exhibits a desorbing function, desorbs the water vapor that it has adsorbed, and releases the water vapor into the air passing through the element (32).

The air that has been dehumidified as a result of passing through the first adsorbent module (3a) flows into the directing chamber (41) of the flow path switching unit (4) through the first aeration path (40a) (see FIG. 7A) and the first introduction opening (51) (see FIG. 8), and the air that has been humidified as a result of passing through the second adsorbent module (3b) flows into the directing chamber (41) of the flow path switching unit (4) through the second aeration path (40b) (see FIG. 7A) and the second introduction opening (52) (see FIG. 8).

In the flow path switching unit (4), as shown in FIG. 9, the damper (44) is in a state where it has rotated in one direction such that the directing chamber (41) is partitioned into the space (8a) and the space (8b). That is, the directing chamber (43) is partitioned by the damper (44) into the space (8a) that includes the first introduction opening (51) and the first inflow opening (18c) and the space (8b) that includes the second introduction opening (52) and the second inflow opening (19c). Consequently, the dehumidified air that has flowed into the one space (8a) in the directing chamber (41) flows into the first room (42) and is blown through the first outflow opening (61) and out from the first blow-out opening (11) (see FIGS. 7A and 7B). On the other hand, the humidified air that has flowed into the other space (8b) in the directing chamber (41) flows into the second room (43) and is blown through the second outflow opening (62) and out from the second blow-out opening (12) (see FIGS. 7A and 7B).

In the first and second adsorbent modules (3a) and (3b), when the adsorbing operation and the desorbing operation are performed for a certain amount of time, next, the powered states (e.g., powered/not powered) of the heaters (31) are switched by circuit control resulting from the control unit. That is, in the first adsorbent module (3a), the heater (31) is powered and emits heat. On the other hand, in the second adsorbent module (3b), power to the heater (31) is cut off and the temperature of the heater drops to room temperature.

Because of this control to switch the powered states of the heaters (31), the adsorbing element (30) of the first adsorbent module (3a) is heated, the adsorbing element (30) of the second adsorbent module (3b) is cooled, and the adsorbing and desorbing operations in the first and second adsorbent modules (3a) and (3b) reverse. As a result, the adsorbent carried in the adsorbing element (30) of the first adsorbent module (3a) exhibits a desorbing function and releases water vapor into the air passing through the element (32), and the adsorbent carried in the adsorbing element (30) of the second adsorbent module (3b) exhibits an adsorbing function and removes water vapor from the air passing through the element (32).

Further, when the powered states (e.g., powered/not powered) of the heaters (31) are switched as described above, the flow paths are switched in the flow path switching unit (4) after the elapse of 0 to 60 seconds, for example, after the switching. That is, in the flow path switching unit (4), the damper (44) rotates in the other direction from the state shown in FIG. 9 to the state shown in FIG. 10 such that the directing chamber (41) is partitioned into the space (9a) and the space (9b).

As shown in FIG. 10, in a state where the damper (44) has rotated in the other direction, the directing chamber (41) is partitioned by the damper (44) into the space (9a) that includes the first introduction opening (51) and the second inflow opening (19c) and the space (9b) that includes the second introduction opening (52) and the first inflow opening (18c). Consequently, the air that has been humidified as a result of passing through the first adsorbent module (3a) flows into the second room (43) from the one space (a) in the directing chamber (41) and is blown through the second outflow opening (62) and out from the second blow-out opening (12) (see FIGS. 7A and 7B). On the other hand, the air that has been dehumidified as a result of passing through the second adsorbent module (3b) flows into the first room (42) from the other space (9b) in the directing chamber (41) and is blown through the first outflow opening (61) and out from the first blow-out opening (11) (see FIGS. 7A and 7B).

The dehumidifying/humidifying device of the present invention reverses, at a certain timing, the adsorbing and desorbing operations in the first adsorbent module (3a) and the adsorbing and desorbing operations in the second adsorbent module (3b) and, in accordance with this, switches the flow paths of air that has been dehumidified and air that has been humidified with the flow path switching unit (4). Thus, for example, the dehumidifying/humidifying device can continuously blow out air that has been dehumidified from the first blow-out opening (11) and can continuously blow out air that has been humidified from the second blow-out opening (12). Additionally, the dehumidifying/humidifying device can use the air that has been dehumidified to defog a window and can use the air that has been humidified to improve comfort.

As described above, the dehumidifying/humidifying device of the present invention, like the first and second aspects, uses the adsorbent modules (3) that has a specific structure, so it is not necessary to dispose a rotating member drive mechanism as in a conventional adsorption rotor system, and, moreover, the device has excellent thermal efficiency and the adsorbing elements (30) and the heaters (31) can be made even more compact. Additionally, the device configuration can be simplified and the device overall can be made even more compact. It will be noted that the dehumidifying/humidifying device shown in FIG. 2B can also be actuated in the same manner as the device shown in FIG. 2A and that the device configuration can be simplified and the device overall can be made even more compact.

Next, the dehumidifying/humidifying device pertaining to the fourth aspect the present invention shown in FIG. 3 will be described. The dehumidifying/humidifying device shown in FIG. 3 is, like the third aspect, a device of a system that simultaneously and continuously blows dehumidified air and humidified air, and the dehumidifying/humidifying device is configured by housing a first blower (2a), a first flow path switching unit (4a), a pair of first and second adsorbent modules (3a) and (3b), a second flow path switching unit (4b) and a second blower (2b) in a casing (not shown) that serves as an air flow path in which a first suction opening, a second suction opening, a first blow-out opening and a second blow-out opening are disposed.

The shape of the casing is, like each of the preceding aspects, not particularly limited, and inside the casing, there are configured two air flow paths: an air flow path that leads from the first suction opening (e.g., the left side of the drawing) to the first blow-out opening (e.g., the right side of the drawing) and an air flow path that leads from the second suction opening (e.g., the right side of the drawing) to the second blow-out opening (e.g., the left side of the drawing). In the one air flow path, there are disposed the first blower (2a) and the first adsorbent module (3a), and in the other air flow path, there are disposed the second blower (2b) and the second adsorbent module (3b). Additionally, the first flow path switching unit (4a) is disposed across the two air flow paths between the first blower (2a) and each of the adsorbent modules (3), and the second flow path switching unit (4) is disposed across the two air flow paths between each of the adsorbent modules (3) and the second blower (2b).

Although it is not shown, the first blow-out opening is, for example, connected to an existing DEF blow-out opening or a new DEF blow-out opening disposed in a dashboard, a ceiling portion or a seat, and the other second blow-out opening is, for example, connected to an existing FACE center blow-out opening or a new FACE blow-out opening disposed in a dashboard, a ceiling portion or a seat. The blowers (2) and each of the adsorbent modules (3) are the same as those of the second and third aspects, and the adsorbent modules (3) are disposed inside the casing such that air that is blown by each of the blowers (2) is capable of passing in parallel through each of the adsorbent modules (3a) and (3b).

In the dehumidifying/humidifying device shown in FIG. 3, the flow path switching units (4) are respectively disposed on the upstream side and the downstream side of the pair of adsorbent modules (3) in order to always blow air in different directions in the two air flow paths. As the first and second flow path switching units (4a) and (4b), like those of the third aspect, units of various types of mechanisms can be employed, but from the standpoint of simplifying the device configuration and making the device compact, the flow path switching unit (4) exemplified in FIG. 7A to FIG. 10 is used.

In that case, the flow path switching units (4a) and (4b) are disposed so as to be in a relationship where the aeration holes corresponding to the first and second introduction openings (51) and (52) (see FIG. 8) are adjacent to aeration surfaces (surfaces to which the elements (32) are exposed) of the adsorbing elements (30) of each of the adsorbent modules (3). That is, as shown in FIG. 3, the first flow path switching unit (4a) and the second flow path switching unit (4b) are disposed with their fronts and backs turned the other way around and so as to sandwich the pair of adsorbent modules (3).

Because of the structure of the flow path switching units (4) shown in FIG. 7A to FIG. 10 and the above-described arrangement of the flow path switching units (4), as shown in FIG. 3, the first flow path switching unit (4a) is configured to be capable of applying air that has been blown from the first blower (2a) to the adsorbing element (30) of the first adsorbent module (3a) (or the adsorbing element (30) of the second adsorbent module (3b)) and introducing, and applying to the first blow-out opening, air that has passed through the adsorbing element (30) of the second adsorbent module (3b) (or the adsorbing element (30) of the first adsorbent module (3a)). Moreover, the first flow path switching unit (4a) is configured to be capable of switching the application destination of air that has been blown from the first blower (2a) and the introduction destination of air that is to be applied to the first blow-out opening.

Further, because of the above-described structure and arrangement of the flow path switching units (4), the second flow path switching unit (4b) is configured to be capable of introducing, and applying to the second blow-out opening, air that has passed through the adsorbing element (30) of the first adsorbent module (3a) (or the adsorbing element (30) of the second adsorbent module (3b)) and applying air that has been blown from the second blower (2b) to the adsorbing element (30) of the second adsorbent module (3b) (or the adsorbing element (30) of the first adsorbent module (3a)). Moreover, the second flow path switching unit (4b) is configured to be capable of switching the introduction destination of air that is to be applied to the second blow-out opening and the application destination of air that has been blown from the second blower (2b).

The dehumidifying/humidifying device of the present invention is configured such that, in order to continuously blow out air that has been dehumidified and air that has been humidified, by switching the powered state (e.g., powered/not powered) of the heater (31) of the first adsorbent module (3a) and the powered state (e.g., powered/not powered) of the heater (31) of the second adsorbent module (3b) and switching each of the flow path switching units (4) in accordance with the powered states, the dehumidifying/humidifying device blows out air that has been dehumidified from the first blow-out opening and blows out air that has been humidified from the second blow-out opening, for example. It will be noted that, in the device of FIG. 3 also, like the preceding aspects, actuation of the blowers (2), the heaters (31) and the flow path switching units (4) is controlled by a separately disposed control unit.

That is, in each of the adsorbent modules (3), the heater (31) is powered in predetermined time intervals based on the adsorbing and desorbing operations of the adsorbing element (30) to interchange the adsorbing function and the desorbing function in the adsorbing element (30). Moreover, in the first adsorbent module (3a) and the second adsorbent module (3b), the heaters (31) are powered alternately. Additionally, in the flow path switching units (4), at the same time as the switching of the powered states (e.g., powered/not powered) of the heaters (31) or after the elapse of a certain amount of time after the switching, the dampers (44) are actuated to switch the application destinations of air that has been blown from the blowers (2) and, at the same time, switch the introduction destinations of air that is to be applied to the first and second blow-out openings.

The dehumidifying/humidifying device of the present invention operates as described below in winter when the outside air is dry, for example. That is, the first blower (2a) sucks in the air inside the cabin from the first suction opening in the casing (the left side of FIG. 3) and blows the air to the first flow path switching unit (4a). The first flow path switching unit (4a) guides the air that has been blown in to the first adsorbent module (3a) because the damper is initially in a position where it has rotated in one direction. In the first adsorbent module (3a), power to the heater (31) is cut off by circuit control resulting from the control unit, and the adsorbing element (30) is held at room temperature. Consequently, the adsorbent carried in the adsorbing element (30) exhibits an adsorbing function and removes water vapor from the air passing through the element (32). Then, when the dehumidified air that has been obtained as a result of passing through the adsorbing element (30) is blown to the second flow path switching unit (4b), the second flow path switching unit (4b)

guides the air that has flowed in to the first outflow opening because the damper is in a position where it has rotated in one direction. As a result, the air that has been dehumidified is blown out from the first blow-out opening in the casing (the right side of FIG. 3).

On the other hand, the second blower (2b) sucks in the air inside the cabin from the second suction opening in the casing (the right side of FIG. 3) and blows the air to the second flow path switching unit (4b). The second flow path switching unit (4b) guides the air that has been blown in to the second adsorbent module (3b) because the damper is, as described above, in a position where it has rotated in one direction. In the second adsorbent module (3b), the heater (31) is powered by circuit control resulting from the control unit, and the adsorbing element (30) is heated. Consequently, the adsorbent carried in the adsorbing element (30) exhibits a desorbing function and releases water vapor into the air passing through the element (32). Then, when the humidified air that has been obtained as a result of passing through the adsorbing element (30) is blown to the first flow path switching unit (4a), the first flow path switching unit (4a) guides the air that has flowed in to the second outflow opening because the damper is in a position where it has rotated in one direction. As a result, the air that has been humidified is blown out from the second blow-out opening in the casing (the left side of FIG. 3).

Next, like the preceding aspects, in each of the adsorbent modules (3), when the above-described adsorbing and desorbing operations are performed for a certain amount of time, the powered states of the heaters (31) are switched by circuit control resulting from the control unit. That is, in the first adsorbent module (3a), the heater (31) is powered such that the adsorbing element (30) is heated, and, in the second adsorbent module (3b), power to the heater (31) is cut off such that the adsorbing element (30) is cooled to room temperature. Moreover, in accompaniment with the switching of the powered states (e.g., powered/not powered) of the heaters (31), the dampers (44) of each of the flow path switching units (4) are switched by circuit control resulting from the control unit. In the first flow path switching unit (4a), the damper is switched to a position where it has rotated in the other direction, and, at the same time, in the second flow path switching unit (4b) also, the damper is switched to a position where it has rotated in the other direction.

When the powering of the heaters (31) in each of the adsorbent modules (3) and the flow paths in the flow path switching units (4) are switched as described above, air that has been blown from the first blower (2a) is guided to the second adsorbent module (3b) by the first flow path switching unit (4a). In the second adsorbent module (3b), the adsorbing element (30) is being cooled to room temperature, so the adsorbent carried in the adsorbing element (30) exhibits an adsorbing function and removes water vapor from the air passing through the element (32). Then, the dehumidified air that has been obtained is guided to the first outflow opening by the second flow path switching unit (4b) and is blown out from the first blow-out opening in the casing.

On the other hand, the air that has been blown out from the second blower (2b) is guided to the first adsorbent module (3a) by the second flow path switching unit (4b). In the first adsorbent module (3a), the adsorbing element (30) is being heated, so the adsorbent carried in the adsorbing element (30) exhibits a desorbing function and releases water vapor into the air passing through the element (32). Then, the humidified air that has been obtained is guided to the second outflow opening by the first flow path switching unit (4a) and is blown out from the second blow-out opening in the casing.

The dehumidifying/humidifying device of the present invention reverses, at a certain timing, the adsorbing and desorbing operations in the first adsorbent module (3a) and the adsorbing and desorbing operations in the second adsorbent module (3b) and, in accordance with this, switches the flow paths of air that has been dehumidified and air that has been humidified with the first and second flow path switching units (4). Thus, for example, the dehumidifying/humidifying device can continuously blow out air that has been dehumidified from the first blow-out opening and can continuously blow out air that has been humidified from the second blow-out opening. Additionally, the dehumidifying/humidifying device can use the air that has been dehumidified to defog a window and can use the air that has been humidified to improve comfort.

As described above, the dehumidifying/humidifying device of the present invention, like each of the preceding aspects, uses the adsorbent modules (3) that have a specific structure, so it is not necessary to dispose a rotating member drive mechanism as in a conventional adsorption rotor system, and, moreover, the device has excellent thermal efficiency and the adsorbing elements (30) and the heaters (31) can be made even more compact. Additionally, the device configuration can be simplified and the device overall can be made even more compact. Further, in the dehumidifying/humidifying device of the present invention, the flows of air reverse in the first adsorbent module (3a) and the second adsorbent module (3b) by switching the desorbing and adsorbing operations, so the performance of the adsorbent can be sufficiently exhibited over the entire lengths of the adsorbing elements (30). Moreover, the flows of air that has been dehumidified and air that has been humidified are in opposite directions, and the first blow-out opening and the second blow-out opening can be disposed in positions away from each other, such as in both ends of the casing, so the degree of freedom of their arrangement inside the vehicle can be improved depending on the intended use.

Moreover, in the dehumidifying/humidifying device of each of the aspects of the present invention, as mentioned before, the adsorbing element (30) of the adsorbent module (3) is configured to be replaceable, so that when its adsorption capability drops because of clogging or the adsorption of substances other than water vapor, the device performance can be restored by removing the adsorbent module (3) from the casing and replacing just the adsorbing element (30). Further, by replacing the adsorbing element (30) in units of several years, for example, without using a filter, the device can be maintained over a long period of time, and maintenance costs can also be reduced.

It will be noted that examples of substances other than water vapor may include odorous substances such as 13 VOC substances (formaldehyde, acetaldehyde, toluene, xylene, ethylbenzene, styrene, paradichlorobenzene, tetradecane, di-n-butyl phthalic acid, di-(2-ethylhexyl) phthalic acid, diazinone, fenobucarb, chlorpyrifos), acetic acid, fatty acids (n-butyric acid), amines and ammonia, but when the adsorbing element (30) is configured to be replaceable as described above, the aforementioned odorous substances and the like that have become concentrated when the inside of the cabin has reached a high temperature can be prevented from being rereleased inside the cabin.

Further, although it is not shown, in the dehumidifying/humidifying device of the third aspect, in order to blow out more comfortable air toward the passenger, a heat exchanger that performs sensible heat exchange between air that has been dehumidified (or humidified) by the first adsorbent module (3a) and air that has been humidified (or dehumidified) by the second adsorbent module (3b) may be disposed on the downstream side of the pair of adsorbent modules (3a) and (3b). Moreover, in the dehumidifying/humidifying device of the fourth aspect, a similar heat exchanger may be disposed on the upstream and downstream sides (both sides) of the pair of adsorbent modules (3a) and (3b).

For example, in the case of the dehumidifying/humidifying device of the third aspect, the humidified air that is blown out toward the passenger from the second blow-out opening (12) is air including water that has been desorbed in the adsorbent modules (30), but there are also cases where the humidified air reaches an unnecessarily high temperature due to the heat of the heaters (31) at the time of thermal desorption. On the other hand, the dehumidified air that is blown out toward the window from the first blow-out opening (11) reaches a low temperature because it passes through the adsorbing element (30) that has been cooled. Thus, in the present invention, the dehumidifying/humidifying device is configured such that a heat exchanger is disposed on the downstream side of the adsorbent modules (3), so that the temperature of the humidified air is lowered and the temperature of the dehumidified air is raised by the heat exchanger.

As the above-described heat exchanger, there can be used various types of heat exchangers such as sensible heat exchangers such as a block-shaped sensible heat heat exchanger that comprises a metal with high thermal conductivity such as aluminium and includes numerous fins on its surface and an orthogonal heat exchanger that includes plural parallel flat plates comprising the same metal as described above and causes high-temperature air and low-temperature air to flow adjacently in mutually adjacent gaps between the flat plates; the heat exchanger is, in the case of the third aspect, for example, disposed across the flow path leading to the first blow-out opening (11) and the second blow-out opening (12). When the above-described heat exchanger is disposed, heat exchange can be performed between humidified air whose temperature is high and dehumidified air whose temperature is low, so that in winter, for example, comfortable air that has been humidified and whose temperature has dropped moderately can be blown out toward the passenger.

Moreover, it is preferable for the heat exchanger to be disposed on the downstream side of the flow path switching unit (4). When the heat exchanger is disposed on the downstream side of the flow path switching unit (4), in comparison to when the heat exchanger is disposed between the adsorbent module (3) and the flow path switching unit (4), there is no interchanging of the flow paths of the high-temperature air and the low-temperature air and there is no heat loss in the heat exchanger itself, so heat exchange can be done efficiently and the temperature of the humidified air that is to be blown out toward the passenger can be lowered.

Further, in the present invention, in order to lower the temperature of the humidified air that is blown from the adsorbent module (3) and raise the temperature of the humidified air, a heater/cooler that utilizes a Peltier element may be disposed on the downstream side of the adsorbent module (3). As is commonly known, a Peltier element is an element that utilizes the Peltier effect and is an electronic part that is used as a cooling device of an electronic device such as a computer. That is, a Peltier element is an element where numerous P-type semiconductors and N-type semiconductors are disposed between two types of metal plates, with a N-P junction being configured by one metal plate and a P-N junction being configured by the other metal plate, and in the element, heat transfer occurs as a result of an electric current flowing through the PN junction portion such that a heat absorbing phenomenon arises in one metal plate and a heat releasing phenomenon arises in the other metal plate.

The heater/cooler is configured by: a Peltier element equipped with a pair of plate surfaces that respectively function as a heat absorbing component and a heat releasing component; and a first heat exchange element and a second heat exchange element, each of which is equipped with an aeratable element for heat exchange, that are disposed on the plate surfaces of the Peltier element. As the structure of the element of each of the first and second heat exchange elements, similar to that in the adsorbing element (30), a corrugated, honeycomb or lattice structure can be used. The position of the heater-cooler is on the downstream side of the flow path switching unit (4) or between the adsorbent module (3) and the flow path switching unit (4). It will be noted that, when the heater/cooler is disposed on the downstream side of the flow path switching unit (4), there is little temperature change in the heater/cooler, so heat loss can be reduced.

In the dehumidifying/humidifying device of the present invention, when the above-described heater/cooler is used, the temperature of the humidified air that is blown out from the adsorbent module (3) can be reliably lowered and the temperature of the dehumidified air can be reliably raised by switching the electric current in the Peltier element synchronously with the switching operation of the adsorbent module (3) to switch between heating and cooling in the first heat exchange element and the second heat exchange element. Further, the temperatures of the humidified air and the dehumidified air can be adjusted by controlling the electric current in the Peltier element.

It will be noted that, in each of the above-described aspects, although the dehumidifying/humidifying device is configured to blow out air that has been dehumidified from the first suction/blow-out opening or the first blow-out opening and to blow out air that has been humidified from the second suction blow-out opening or the second blow-out opening, the dehumidifying/humidifying device may also be configured to blow out air that has been humidified from the first suction/blow-out opening or the first blow-out opening and to blow out air that has been dehumidified from the second suction/blow-out opening or the second blow-out opening by reversing control of the powered state (e.g., powered/not powered) of the heater (31) of the adsorbent module (3). Thus, for example, in summer, when the outside air becomes humid, dehumidified air can be blown out toward the passenger from the second suction/blow-out opening or the second blow-out opening to improve the comfort inside the cabin. Further, a deodorization filter may be disposed on the upstream side or the downstream side of the adsorbent module (3) in order to trap odorous components in the cabin. Moreover, in the dehumidifying/humidifying device of the present invention, the shape and direction of the flow path, the arranged configuration of the adsorbent module (3) and the arrangement of the blower (2) are not limited to the structures shown in the drawings and can be appropriated designed as long as they do not compromise the functions of these.

INDUSTRIAL APPLICABILITY

The present invention is applicable to vehicles in general as a vehicle dehumidifying/humidifying device that supplies dehumidified air for defogging to a window of a vehicle or supplies humidified air to a passenger.

EXPLANATION OF THE REFERENCE NUMERALS

1: Casing
10: Suction Opening

11: First Blow-Out Opening
12: Second Blow-Out Opening
2: Blower
2a: First Blower
2b: Second Blower
3: Adsorbent Module
3a: First Adsorbent Module
3b: Second Adsorbent Module
30: Adsorbing Element
31: Heater
32: Element
33: Heat Insulating Board
4: Flow Path Switching Unit
4a: First Flow Path Switching Unit
4b: Second Flow Path Switching Unit
41: Directing Chamber
42: First Room
43: Second Room
44: Damper
45: Actuator
7: Flow Path Switching Unit

The invention claimed is:

1. A vehicle dehumidifying/humidifying device that dehumidifies and humidifies air inside a vehicle cabin, the vehicle dehumidifying/humidifying device comprising:
a first blower;
a first flow path switching unit;
a pair of first and second adsorbent modules;
a second flow path switching unit;
a second blower; and
a casing that serves as an air flow path in which a first suction opening, a second suction opening, a first blow-out opening and a second blow-out opening are disposed, the first and second blowers, the first and second adsorbent modules, and the first and second flow path switching units being provided inside said casing, said casing being disposed in a ceiling of the vehicle cabin, and the first and second suction openings being in communication with the inside of the vehicle cabin for sucking the air inside the vehicle cabin into the first and second blowers, respectively,
wherein
each of the adsorbent modules includes an adsorbing element comprising an adsorbent carried in an aeratable element and a heater that is directly disposed on a first side of a non-aeration surface of the adsorbing element, the heater including a flat plate surface that releases heat, the aeratable element being disposed on a second side of the non-aeration surface opposite the first side of the non-aeration surface, with each of the adsorbent modules being disposed inside the casing and fixedly provided at the air flow path such that air that is blown by each of the blowers is capable of passing in parallel respectively through each of the adsorbing elements,
the first flow path switching unit is capable of applying air that has been blown from the first blower to the adsorbing element of the first adsorbent module or the adsorbing element of the second adsorbent module, and applying to the first blow-out opening, air that has passed through the adsorbing element of the second adsorbent module or the adsorbing element of the first adsorbent module, and is capable of switching the flow path of air that has been blown from the first blower and the flow path of air that is to be applied to the first blow-out opening,
the second flow path switching unit is capable of introducing, and applying to the second blow-out opening, air that has passed through the adsorbing element of the first adsorbent module or the adsorbing element of the second adsorbent module and applying air that has been blown from the second blower to the adsorbing element of the second adsorbent module or the adsorbing element of the first adsorbent module and is capable of switching the flow path of air that is to be applied to the second blow-out opening and the flow path of air that has been blown from the second blower,
the vehicle dehumidifying/humidifying device blows out air that has been dehumidified or humidified from the first blow-out opening and blows out air that has been humidified or dehumidified from the second blow-out opening based on a powered state of the heater of the first adsorbent module, a powered state of the heater of the second adsorbent module, and the flow path of the air set by the first and second flow path switching units in accordance with the powered states of the heaters of the first and second adsorbent modules,
the aeratable element has a structure where honeycomb sheets, in each of which one row of cells is formed as a result of a corrugated base material sheet being superimposed on a flat base material sheet, are plurally adjacently disposed and adjacent honeycomb sheets convey air flow in a same aeration direction, and
the aeratable element is housed in a metal casing.

2. The vehicle dehumidifying/humidifying device according to claim 1, wherein the adsorbent is a crystalline aluminophosphate including at least Al and P in a framework structure.

3. The vehicle dehumidifying/humidifying device according to claim 1, wherein the adsorbing element of the adsorbent module is configured to be replaceable.

4. The vehicle dehumidifying/humidifying device according to claim 1, wherein the honeycomb sheets are orthogonal to the flat plate surface of the heater.

5. The vehicle dehumidifying/humidifying device according to claim 1, wherein the flow path switching unit is configured such that a damper that is actuated by an actuator switches the application destination of each air flow.

6. The vehicle dehumidifying/humidifying device according to claim 1, wherein a total opening area orthogonal to an aeration direction of the adsorbing element of the adsorbent module is equal to or greater than a minimum opening cross-sectional area orthogonal to an aeration direction of the flow path on an upstream side and a downstream side of the adsorption module.

7. The vehicle dehumidifying/humidifying device according to claim 1, wherein the air inside the vehicle cabin is humidified when the heater is powered on and the air inside the vehicle cabin is dehumidified when the heater is not powered on.

8. The vehicle dehumidifying/humidifying device according to claim 1, wherein the adsorbing element of the adsorbent module has an adsorption characteristic where a difference between its adsorption amount at a relative humidity of 25% and its adsorption amount at a relative humidity of 2% in a water vapor adsorption isotherm of 25° C. is equal to or greater than 0.14 g/g.

9. The vehicle dehumidifying/humidifying device according to claim 1, wherein a bottom surface of the metal casing is the non-aeration surface of the adsorbing element.

10. The vehicle dehumidifying/humidifying device according to claim 1, further comprising a blower duct with a first end abutting an outlet of the blower and a second end abutting an inlet of adsorbent module.

11. The vehicle dehumidifying/humidifying device according to claim 10, wherein said casing includes ribs which hold the blower duct.

\* \* \* \* \*